United States Patent [19]
Nagai et al.

[11] Patent Number: 5,846,276
[45] Date of Patent: Dec. 8, 1998

[54] EXHAUST GAS FILTER

[75] Inventors: Nobuaki Nagai, Miyazaki-gun; Shinji Wada, Miyazaki; Yuichi Murano, Miyazaki-gun; Sachinori Ikeda, Miyazaki-gun; Kouichi Watanabe, Miyazaki-gun; Satoshi Matsueda, Miyazaki-gun; Makoto Ogawa, Otsu, all of Japan

[73] Assignee: Matsushita Electric Industrial Co., Ltd., Osaka, Japan

[21] Appl. No.: 665,876

[22] Filed: Jun. 19, 1996

[30] Foreign Application Priority Data

| Jul. 5, 1995 | [JP] | Japan | 7-169460 |
| Jul. 21, 1995 | [JP] | Japan | 7-185235 |
| Jul. 21, 1995 | [JP] | Japan | 7-185236 |
| Jul. 21, 1995 | [JP] | Japan | 7-185237 |
| Sep. 5, 1995 | [JP] | Japan | 7-227706 |

[51] Int. Cl.$^6$ ............................................. B01D 39/20
[52] U.S. Cl. ................ 55/523; 55/DIG. 5; 55/DIG. 30; 60/311; 264/177.12; 264/DIG. 48; 428/116
[58] Field of Search .................... 55/523–528, DIG. 30, 55/DIG. 5, 385.3; 60/311; 264/177.12, DIG. 48; 428/116–118

[56] References Cited

U.S. PATENT DOCUMENTS

| 4,327,188 | 4/1982 | Endo | 501/134 |
| 5,322,537 | 6/1994 | Nakamura et al. | 55/523 |
| 5,545,243 | 8/1996 | Kotani et al. | 55/523 |
| 5,549,725 | 8/1996 | Kasai et al. | 55/DIG. 30 |

FOREIGN PATENT DOCUMENTS

| 56-092164 | 7/1981 | Japan . |
| 57-056379 | 4/1982 | Japan . |
| 61-138513 | 6/1986 | Japan . |
| 62-40061B2 | 8/1987 | Japan . |
| 2-53083B2 | 11/1990 | Japan . |
| 3-10365B2 | 2/1991 | Japan . |

OTHER PUBLICATIONS

English abstract of JP 62–40061, Aug. 26, 1987.
English abstract of JP 56–92164, Jul. 25, 1981.
English abstract of JP 57–56379, Apr. 3, 1982.

*Primary Examiner*—Richard L. Chiesa
*Attorney, Agent, or Firm*—Stevens, Davis, Miller & Mosher, L.L.P.

[57] ABSTRACT

An exhaust gas filter for passing exhaust gas of a diesel engine or the like therethrough, thereby removing particulate matter from the exhaust gas. By suitably controlling physical properties of the exhaust gas filter such as a thermal expansion coefficient, the durability of the exhaust gas filter can be enhanced. When a constituent material for the exhaust gas filter includes aluminum titanate as a primary component, the durability can be further enhanced.

2 Claims, 8 Drawing Sheets

EXHAUST GAS FILTER

BACKGROUND OF THE INVENTION

1. Field of the Invention

This invention relates to an exhaust gas filter for collecting (or arresting) and treating particulate matter, such as soot, contained in exhaust gas discharged from a combustion engine such as a diesel engine, and the invention also relates to a method of producing such an exhaust gas filter.

2. Description of the Related Art

Recently, as the environmental problems have become serious, attention has been directed to the treatment of particulate matter (e.g. soot) dispersed to the atmosphere together with exhaust gas discharged from a combustion engine such as a diesel engine. Such particulate matter is arrested or collected by an exhaust gas filter connected to an exhaust pipe intermediate thereof. As the exhaust gas filter thus collects the particulate matter, its collecting ability for particulate matter is gradually lowered, and therefore when the amount of the particulate matter collected by the exhaust gas filter reaches a predetermined level, the collected particulate matter must be burned so as to regenerate the exhaust gas filter. Usually, an electric heater method is used for regenerating the exhaust gas filter. In this electric heater method, an electric heater is provided at the exhaust gas inlet side or the exhaust gas outlet side, and the electric heater is heated to heat the particulate matter to set fire to and burn the same. The burning temperature is controlled by the amount of the supplied air. All of the collected particulate matter is not burned at one time, but the burning (combustion) of the collected particulate matter proceeds gradually, beginning from its end, and therefore a temperature gradient is produced in the exhaust gas filter, so that a thermal stress and a thermal shock occur. At this time, the amount of collection of the particulate matter can not be accurately detected, and the actual collection amount frequently varies ±40% with respect to the target collection amount, which results in a possibility that abnormal combustion occurs. This abnormal combustion means a phenomenon in which when the particulate matter is collected in an amount larger than the target amount, abrupt combustion takes place at the time of regeneration, so that the temperature rises to not lower than 1,000° C. The exhaust gas filter is required to have a thermal resistance to withstanding this abnormal combustion. The exhaust gas filter is also strongly required to have a low thermal expansion coefficient and a high thermal shock resistance so that the exhaust gas filter will not be subjected to a fatigue failure due to a thermal stress and a thermal shock caused by a heat history due to the regeneration treatment. The exhaust gas filter is further required to have a high efficiency of collection of the particulate matter and also to have a low pressure loss. It is quite important that these properties or characteristics are balanced. To meet these requirements, an extensive study and development of exhaust gas filters have been made from various aspects.

One example of materials for an exhaust gas filter is sintered cordierite ($2MgO.2Al_2O_3.5SiO_2$) Generally, the crystal of cordierite generally exhibits anisotropic thermal expansion, and its thermal expansion coefficient is $2.0 \times 10^{-6}$ °$C.^{-1}$ in an a-axis, and is $-0.9 \times 10^{-6}$ °$C.^{-1}$ in a c-axis. However, a plate crystal of kaoline, talc and so on undergoes a shearing force in an extrusion step to be dispersed in a direction parallel to the lattice, and therefore in a sintering step, this plate crystal serves as the origin of growth of the sintered crystal, so that the c-axis of the crystal of the cordierite is oriented slightly more in the extruding direction. Therefore, with the combination of the crystal direction of the cordierite with the plate crystal, the thermal expansion coefficient in the extruding direction is $0.4 \sim 0.7 \times 10^{-6}$ °$C.^{-1}$, and the thermal expansion coefficient in a direction perpendicular to the extruding direction is $0.9 \sim 1.5 \times 10^{-6}$ °$C.^{-1}$. Thus, the thermal expansion coefficient becomes low in all directions, and this is effective against a thermal shock.

Another example of material for an exhaust gas filter is aluminum titanate ($Al_2O_3.TiO_2$). Aluminum titanate has a melting temperature as high as not lower than 1,600° C., and therefore withstands abnormal combustion occurring during regeneration of the exhaust gas filter, thus exhibiting excellent thermal (heat) resistance. However, a thermal expansion coefficient of aluminum titanate is $11.8 \times 10^{-6}$ °$C.^{-1}$ in an a-axis, $19.4 \times 10^{-6}$ °$C.^{-1}$ in a b-axis, and $-2.6 \times 10^{-6}$ °$C.^{-1}$ in a c-axis, and is anisotropic depending on the crystal direction. In aluminum titanate, during the extrusion for shaping, the c-axis is oriented in the extruding direction, and also crystal grains grow in the extruding direction into a columnar or a plate-like form during the sintering. Therefore, there has been a tendency that the thermal expansion coefficient in the extruding direction has been about $-1.0 \times 10^{-6}$ °$C.^{-1}$ in the range of from room temperature to 800° C. while the thermal expansion coefficient in a direction perpendicular to the extruding direction has been as high as about $3.0 \times 10^{-6}$ °$C.^{-1}$.

Next, a method of producing a conventional exhaust gas filter will be described. First, a pore-forming agent is mixed with ceramics powder in a dispersed manner to form a paste-like material. Then, this paste-like material is extruded through a honeycomb die to form a honeycomb structural member (or body). Then, this honeycomb structural member is calcined or baked to eliminate the pore-forming agent by burning, and also to firmly bind the honeycomb structural member, thereby producing the exhaust gas filter.

However, the above conventional exhaust gas filter, when made of cordierite, melts at a high temperature of about 1,400° C. as a result of abnormal combustion, and hence is damaged by melting. When such melting damage develops in the exhaust gas filter, the configuration of this filter is changed, so that its ability of collecting particulate matter is lowered, and besides since the amount of collection of the particulate matter in the exhaust gas filter varies locally, there arises a high possibility that another melting damage is induced, thereby increasing a pressure loss, which results in a problem that a diesel engine fails to operate properly. On the other hand, aluminum titanate has a high melting point, and therefore has a higher resistance to the above abnormal combustion, thus exhibiting excellent thermal resistance. However, the thermal expansion coefficient of aluminum titanate is anisotropic depending on the crystal orientation, and besides the crystal orientation becomes uniform during the growth of the grains in the sintering step of the production process, so that the overall thermal expansion coefficient of the exhaust gas filter becomes high. Therefore, when the regeneration treatment is repeated, a stress due to thermal expansion and a stress due to thermal contraction repeatedly develop in the exhaust gas filter, so that the exhaust gas filter is subjected to thermal fatigue, and finally cracks develop in the exhaust gas filter, thus damaging the filter.

SUMMARY OF THE INVENTION

With the above problems in view, it is an object of this invention to provide an exhaust gas filter which has a high melting point, an excellent thermal resistance, a high resistance to abnormal combustion, a low thermal expansion coefficient, a high resistance to a fatigue due to a heat history, and excellent durability, also to provide a method of producing a exhaust gas filter, excellent in thermal resistance and thermal fatigue resistance, at a high production efficiency and a high mass-production efficiency at a high production yield rate.

With the above problems in view, another object of the invention is to provide an exhaust gas filter, as well as a method of producing such an exhaust gas filter, in which a fatigue of a highly heat-resistant, sintered aluminum titanate member due to a thermal shock is reduced, thereby enhancing a thermal shock resistance, thus achieving a high thermal resistance.

With the above problems in view, a further object of the invention is to provide a low-thermal expansion material which has a low thermal expansion coefficient and a high thermal resistance, and is not increased in thermal expansion coefficient by crystal decomposition after a long-term heat treatment at high temperatures, and has an excellent thermal shock resistance, and also to provide an exhaust gas filter using such a low-thermal expansion coefficient material, which filter is to be mounted on a diesel engine.

In the present invention, aluminum titanate, used as a filter material, has a low thermal expansion coefficient of $1.5 \times 10^{-6}/°C$., and has a high melting point of not less than 1,700° C. Therefore, this aluminum titanate material is much better than cordierite, and when the aluminum titanate is used as the filter material, the filter can satisfactorily withstand a high temperature of not lower than 1,400° C., and a thermal shock and a thermal stress developing at such a high temperature. One object of this invention is to provide an exhaust gas filter for a diesel engine which comprises aluminum titanate as a main component of a filter material, and is not subjected to melting damage and cracking during regeneration by burning.

With the above problems in view, a further object of the invention is to provide an exhaust gas filter which has a filter construction and a cell construction suitable for collecting particulate matter, and has excellent filter properties achieved by suitably controlling the thickness of thin walls (defining the cells), a pressure loss and the porosity, and has a low thermal expansion coefficient, an excellent thermal shock resistance, and an excellent thermal resistance.

With the above problems in view, a further object of the invention is to provide an exhaust gas filter which has narrow pores distributed uniformly, a suitable pressure loss, a suitable porosity, a suitable number of cells, excellent filter properties, a low thermal expansion coefficient, excellent mechanical strength such as a tensile strength, a high thermal conductivity, and an excellent thermal shock resistance, and also to provide a method capable of mass-producing such an excellent exhaust gas filter at a high production efficiency.

DESCRIPTION OF THE PREFERRED EMBODIMENTS

[First Embodiment]
(Examples 1 to 11 and Comparative Examples 1 to 9)

Figure 1:
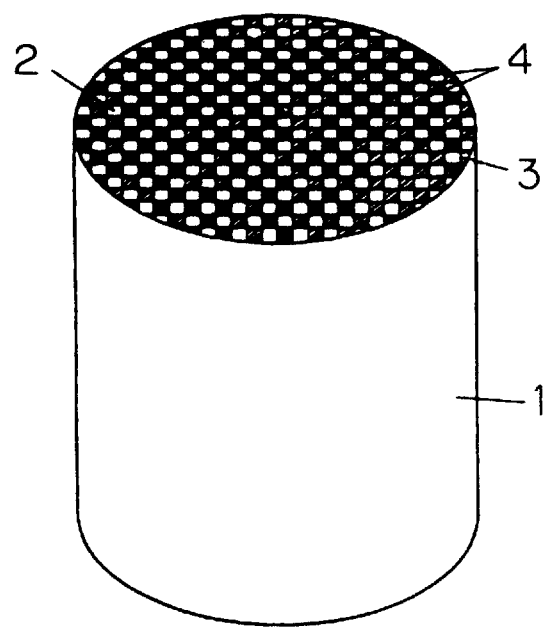
FIG. 1 is a perspective view of an essential part of an exhaust gas filter according to Example 1 of a first embodiment of the invention.
Figure 2:
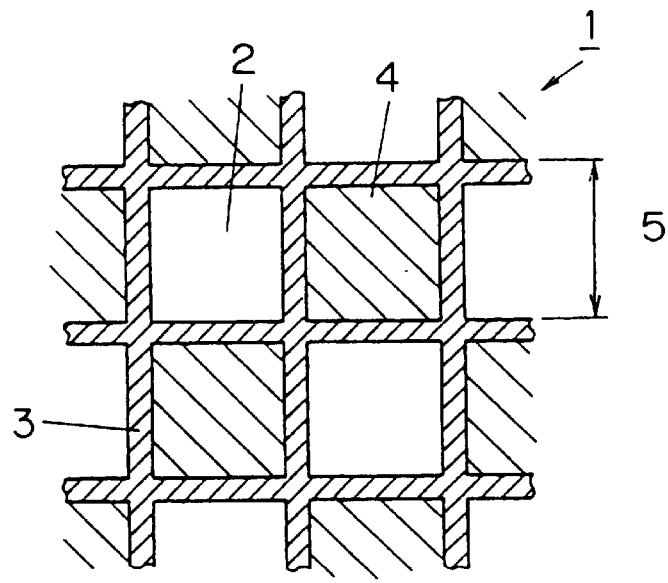
FIG. 2 is a fragmentary enlarged cross-sectional view showing a portion of a lattice of the exhaust gas filter of Example 1.
Figure 3:
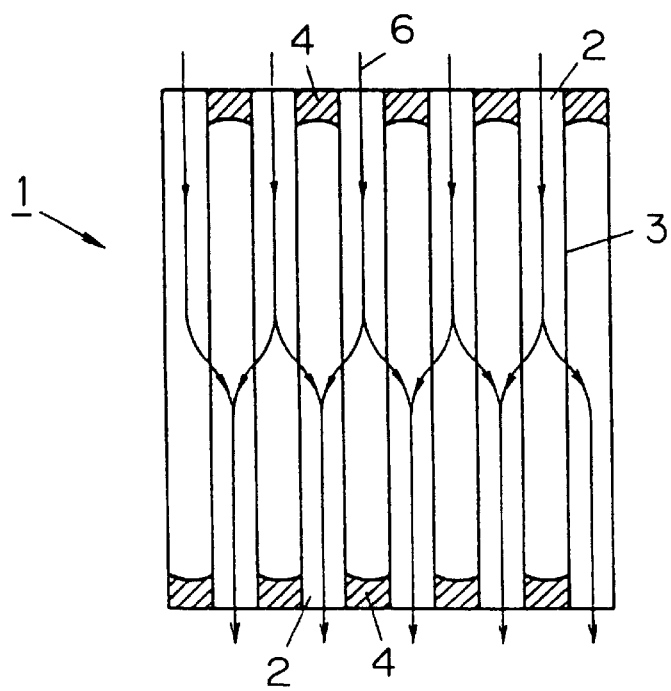
FIG. 3 is a sectional side view showing an essential part of the exhaust gas filter of Example 1.

Example 1 of the present invention will now be described with reference to the drawings. FIG. 1 is a perspective view showing an essential part of an exhaust gas filter of Example 1, FIG. 2 is a fragmentary enlarged cross-sectional view of a portion of a lattice of the exhaust gas filter of Example 1, and FIG. 3 is a sectional side view of an essential part of the exhaust gas filter of Example 1. In FIGS. 1 to 3, reference numeral 1 denotes the exhaust gas filter of Example 1 which comprises a honeycomb columnar body having a diameter of about 144 mm and a length of about 155 mm. Reference numeral 2 denotes a vent portion through which exhaust gas and particulate matter (e.g. soot), contained therein, pass. Reference numeral 3 denotes a lattice portion having a square, a hexagonal, a polygonal or a circular shape in section, and through which exhaust gas passes, and on which partition walls the particulate matter accumulates. A large number of pores are formed in the lattice portion 3. The partition wall of the lattice portion 3 has a thickness of about 0.4 mm. Closure portions or members 4 are embedded alternately in each end of the lattice portion 3 to distinguish inlet passages and discharge passages from each other, each closure portion 4 having a length of 5~7 mm. Reference numeral 5 denotes the pitch of the partition walls of the lattice portion 3, and this pitch is about 4 mm. Reference numeral 6 denotes a direction of movement of the exhaust gas.

A method of producing the exhaust gas filter of the above construction will now be described. For preparing exhaust gas filters of Examples 1 to 11, 100 parts by weight of powder (aluminum titanate powder), comprising aluminum titanate as a primary component, and having an average particle size of 10 μm, 10 to 60 parts by weight of pore-forming agent powder having an average particle size of 20 to 61 μm and an average aspect ratio of 1.2 to 2.0, and methyl cellulose (binder) were mixed together. As the pore-forming agent, activated carbon, coke, a polyethylene resin, a polystyrene resin, a polyolefin resin, wheat starch, potato starch and graphite were used. The shape and blend ratio of the materials are shown in Table 1.

TABLE 1

| No. | Particle size of aluminum titanate powder (μm) | Pore-forming agent Material wt. part | Average particle size (μm) | Average aspect ratio | Thermal expansion coefficient ($\times 10^{-6}$ °C$^{-1}$) Extruding direction | Perpendicular direction | Orientation of crystal grains |
|---|---|---|---|---|---|---|---|
| Example 1 | 10 | Activated carbon (10) | 41 | 2.0 | 0.7 | 1.7 / 1.7 | Generally random |
| Example 2 | 10 | Activated carbon (20) | 41 | 2.0 | 0.8 | 1.6 / 1.6 | Generally random |
| Example 3 | 10 | Activated carbon (60) | 41 | 2.0 | 0.8 | 1.5 / 1.6 | Generally random |
| Example 4 | 10 | Coke (20) | 49 | 1.5 | 0.8 | 1.7 / 1.7 | Generally random |
| Example 5 | 10 | Polyethylene resin (20) | 20 | 1.2 | 0.7 | 1.8 / 1.8 | Generally random |
| Example 6 | 10 | Polyethylene resin (20) | 61 | 1.2 | 0.8 | 1.5 / 1.5 | Generally random |
| Example 7 | 10 | Polyethylene resin (20) | 21 | 1.3 | 0.8 | 1.6 / 1.7 | Generally random |
| Example 8 | 10 | Polyolefin resin (20) | 23 | 1.3 | 0.7 | 1.7 / 1.7 | Generally random |
| Example 9 | 10 | Wheat starch (20) | 24 | 1.2 | 0.7 | 1.7 / 1.7 | Generally random |
| Example 10 | 10 | Potato starch (20) | 39 | 1.2 | 0.7 | 1.8 / 1.7 | Generally random |
| Example 11 | 10 | Graphite (20) | 22 | 1.6 | 0.7 | 1.7 / 1.7 | Generally random |

| No. | Average pure diameter (μm) | Porosity (%) | Condition after thermal resistance test | Pressure loss (mmaq) | Collection efficiency (%) | Number of regeneration (times) |
|---|---|---|---|---|---|---|
| Example 1 | 26 | 29 | Slightly contracted | 1930 | 84 | More than 100 |
| Example 2 | 24 | 38 | Slightly contracted | 1150 | 80 | More than 100 |
| Example 3 | 27 | 63 | Slightly contracted | 670 | 71 | More than 100 |
| Example 4 | 31 | 37 | Slightly contracted | 1010 | 77 | More than 100 |
| Example 5 | 8 | 35 | Slightly contracted | 1310 | 81 | More than 100 |
| Example 6 | 42 | 41 | Slightly contracted | 710 | 72 | More than 100 |
| Example 7 | 10 | 37 | Slightly contracted | 1350 | 83 | More than 100 |
| Example 8 | 10 | 39 | Slightly contracted | 1010 | 79 | More than 100 |
| Example 9 | 13 | 36 | Slightly contracted | 1400 | 84 | More than 100 |
| Example 10 | 27 | 39 | Slightly contracted | 1170 | 81 | More than 100 |
| Example 11 | 11 | 37 | Slightly contracted | 1760 | 82 | More than 100 |

The mixing was carried out using a mixer, and more specifically the dry mixing was carried out. Then, 3 to 6 parts by weight of glycerin (plasticizer) and 31 to 38 parts by weight of water was added to the above mixture, and this mixture was mixed by a kneader, and then was further uniformly mixed and dispersed by three rollers. The thus mixed specimen was charged into a vacuum extruder, and was extruded into the configuration of the honeycomb columnar body 1, and this shaped (or extruded) honeycomb columnar member was dried. Then, the shaped honeycomb columnar member was charged into a calcination furnace, and was calcined while forming pores therein, thereby producing the exhaust gas filter. At this time, the calcination was carried out in such a manner the shaped honeycomb columnar member was heated to 1,500° C. at a temperature rise rate of 10° C./hour, and was maintained for 4 hours.

Next, a method of measuring the shape and structure of the materials and the exhaust gas filters will be described.

The average particle size of each material was measured using a laser particle size distribution measurement device. In these Examples, the powder, comprising aluminum titanate as a primary component, had the average particle size of 10 μm, and a median thereof was 8 to 9 μm slightly smaller than the average particle size, and the particles of the medial were distributed irregularly.

The aspect ratio means the ratio of the major axis to the minor axis, and is one index indicating the degree of the irregularity. The pore-forming agent specimen was magnified by a scanning electronic microscope, and then each side was measured, and the average aspect ratio was determined by averaging the values of 10 specimens.

The average pore diameter and the porosity of the exhaust gas filter were measured using a mercury porosimeter. The orientation of crystal grains was found by observing 20 crystal grains through a microscope.

The thermal expansion coefficient was measured by a thermal analysis (TMA) measurement device.

Results of the above measurements are shown in Table 1.

Next, the performance test of the exhaust gas filter will be described.

In order to determine the thermal resistance of the exhaust gas filter of each Example, the exhaust gas filter was held in an electric furnace for 10 hours at 1,550° C., and then was removed from the electric furnace, and the appearance thereof was observed.

The value of the pressure loss and the collection efficiency were measured using a collection regeneration test device. Referring to the construction of the collection regeneration test device, a hot air-generating portion and an acetylene carbon-spraying portion were provided at a collection inlet side, and an electric heater portion for burning acetylene carbon and an air supply portion were provided at a collection outlet side. Further, a temperature measurement portion, having a thermocouple inserted in a ventilation portion, was provided, and a pressure measurement portion for measuring a pressure difference between the collection inlet side and the collection outlet side was provided. The value of the pressure loss was measured as follows. The electric heater portion was heated, and the amount of supply of the air from the air supply portion was controlled, thereby stabilizing the temperature of the exhaust gas filter at 300° C. Acetylene carbon was supplied from the acetylene carbon-spraying portion into the exhaust gas filter for 30 minutes, and the acetylene carbon was collected by the exhaust gas filter. Immediately before this collecting operation was finished, the pressure difference between the collection inlet side and the collection outlet side was measured by the pressure measurement portion, thus determining the pressure loss value. The collection efficiency was determined by the ratio of the amount of the used acetylene carbon and the amount of the acetylene carbon collected by the exhaust gas filter.

The thermal shock resistance was evaluated as follows. After the weight of the collected acetylene carbon, supplied from the above collection regeneration device, was measured, the collected acetylene carbon was burned by the electric heater portion, thereby regenerating the exhaust gas filter. This collection-burning operation was determined as one cycle of the regeneration, and this cycle was repeated, and that time when the collection efficiency was extremely lowered was determined as the regeneration limit, and based on this, the thermal shock property was evaluated.

Results of the above evaluation are shown in Table 1.

As is clear from Table 1, it has been found that in the exhaust gas filters of Examples 1 to 11, the thermal expansion coefficient in the extruding direction is an extremely low value of $0.7 \sim 0.8 \times 10^{-6}$ °C.$^{-1}$ and that the thermal expansion coefficient in a direction perpendicular to the extruding direction is an extremely low value of $1.5 \sim 1.8 \times 10^{-6}$ °C.$^{-1}$. It has been found that the reason for this is that the orientation of the crystal grains is generally random, and hence is not anisotropic. The average pore diameter was 8 to 42 μm, and the porosity was 29 to 63%. From results of the thermal resistant test, it has been found that the exhaust gas filers of Examples 1 to 11 are slightly contracted or shrunk, and are not subjected to melting damage, and hence are excellent in thermal resistance. The pressure loss was in the range of between about 700 to about 2,000 mmaq, and the collection efficiency was in the range of from 71 to 84%, and thus it has been found that the exhaust gas-passing ability and the collection ability are suitably compatible with each other. With respect to the number of regenerations representing the thermal shock resistance, the exhaust gas filters were not deteriorated even after the regeneration was effected 100 times, thus exhibiting that the thermal shock resistance is high.

Next, exhaust gas filters of Comparative Examples 1 to 9 were prepared using materials not falling within the range of the present invention. These exhaust gas filters were prepared in the same manner as described for Examples 1 to 11, and evaluation tests of the thus prepared exhaust gas filters of Comparative Examples 1 to 9 were conducted in the same manner as described above. Results thereof are shown in Table 2.

TABLE 2

| | Particle size of aluminum titanate powder (μm) | Pore-forming agent | | | Structure of exhaust gas filter | | |
|---|---|---|---|---|---|---|---|
| | | | | | Thermal expansion coefficient ($\times 10^{-6}$°C.$^{-1}$) | | |
| No. | | Material | Average particle size (μm) | Average aspect ratio | Extruding direction | Perpendicular direction | Orientation of crystal grains |
| Comparative Example 1 | 10 | None | — | — | −1.1 | 2.8 2.9 | |
| Comparative | 10 | Activated | 41 | 2.0 | 0.8 | 1.5 | Generally |

TABLE 2-continued

| | | | | | | | |
|---|---|---|---|---|---|---|---|
| Example 2 | | carbon (70) | | | | 1.5 | random |
| Comparative Example 3 | 10 | Polyethylene resin (20) | 13 | 1.3 | 0.7 | 1.8 / 1.8 | Generally random |
| Comparative Example 4 | 10 | Polyethylene resin (20) | 92 | 1.2 | 0.8 | 1.6 / 1.5 | Generally random |
| Comparative Example 5 | 26 | Activated carbon (20) | 41 | 2.0 | −0.4 | 2.3 / 2.2 | |
| Comparative Example 6 | 26 | Coke (20) | 49 | 1.5 | −0.4 | 2.2 / 2.2 | |
| Comparative Example 7 | 10 | Graphite (20) | 36 | 2.2 | −0.6 | 2.4 / 2.5 | |
| Comparative Example 8 | 10 | Graphite (20) | 36 | 2.5 | −0.8 | 2.6 / 2.6 | |
| Comparative Example 9 | 10 | Graphite (20) | 36 | 2.9 | −0.9 | 2.8 / 2.7 | |

| | Structure of exhaust gas filter | | Results of evaluation test | | | |
|---|---|---|---|---|---|---|
| No. | Average pure diameter ($\mu$m) | Porosity (%) | Condition after thermal resistance test | Pressure loss (mmaq) | Collection efficiency (%) | Number of regeneration (times) |
| Comparative Example 1 | 4 | 18 | Slightly contracted | — | — | — |
| Comparative Example 2 | 25 | 69 | Slightly contracted | 470 | 68 | 65 |
| Comparative Example 3 | 6 | 35 | Slightly contracted | 3220 | 96 | — |
| Comparative Example 4 | 77 | 39 | Slightly contracted | 290 | 49 | — |
| Comparative Example 5 | 27 | 36 | Slightly contracted | 1190 | 79 | 29 |
| Comparative Example 6 | 29 | 38 | Slightly contracted | 1100 | 75 | 21 |
| Comparative Example 7 | 24 | 36 | Slightly contracted | 970 | 73 | 12 |
| Comparative Example 8 | 21 | 36 | Slightly contracted | 940 | 75 | 15 |
| Comparative Example 9 | 20 | 34 | Slightly contracted | 930 | 76 | 11 |

In Comparative Example 1 in which a pore-forming agent was not used, the pressure loss and the collection efficiency could not be measured, and this exhaust gas filter did not perform the function of an exhaust gas filter at all. In Comparative Example 2 in which the content of a pore-forming agent was increased, the collection efficiency was as low as 68%, and besides the thermal shock resistance was low. The thermal shock resistance was lowered because the strength was lowered, so that this exhaust gas filter could not withstand a stress due to a heat history. In Comparative Example 3 in which a pore-forming agent had a small average particle size, the pressure loss was as large as 3,220 mmaq. In Comparative Example 4 in which a pore-forming agent had a large average particle size, the collection efficiency was as low as 49%. In Comparative Examples 5 and 6 in which aluminum titanate powder had a large particle size, the number of regenerations of the former was as small as 21, and the number of regenerations of the latter was as small as 29. In Comparative Examples 7 to 9 in which the pore-forming agent had a large average aspect ratio, the number of regenerations was very small value of not more than 15. In Comparative Examples 1 and 5 to 9, the thermal expansion coefficient in a direction perpendicular to an extruding direction is high on the order of $2.2 \sim 2.9 \times 10^{-6}$ $°C.^{-1}$. Referring to the reason for this, in Comparative Example 1, there is no pore-forming agent, and therefore aluminum titanate powder is subjected to a shearing force, so that an c-axis is oriented. In Comparative Examples 5 and 6, the particle size is large, and in Comparative Example 7 to 9, the average aspect ratio of the pore-forming agent is large, and therefore a stress field for the shearing force, developing during the extrusion, is not disturbed, so that the c-axis of the aluminum titanate powder is oriented.

Next, the influence of the temperature rise rate during the calcination step in this embodiment will be described.

Exhaust gas filters were prepared according to the same procedure of Example 3 except that the temperature rise rate in the calcination step was set to four stages, that is, 1° C./hour, 10° C./hour 30° C./hour and 50° C./hour. In the case of the temperature rise rate of 1°~30° C./hour, good results were obtained with respect to the construction of the exhaust gas filters and the evaluation tests. In the case of the temperature rise rate of 50° C./hour, cracks developed during the calcination step. The reason for this is that the pore-forming agent is subjected to an abrupt combustion reaction because of the abrupt temperature rise, so that a localized temperature difference occurs, and when this temperature difference becomes extremely large, cracks are caused by a thermal stress.

As described above, the exhaust gas filters of this embodiment comprise aluminum titanate as a main component, and the average pore diameter, the porosity and the thermal expansion coefficient are optimally controlled, and therefore the exhaust gas filters have a high thermal resistance to withstand abnormal combustion, the lower thermal expansion coefficient, and a high thermal shock resistance. The exhaust gas filters of this embodiment also have a low pressure loss and a high collection efficiency, and therefore have well-balanced exhaust gas characteristics. As the pore-forming agent, activated carbon, coke, a polyethylene resin, a polystyrene resin, a polyolefin resin, wheat starch, potato starch and graphite are used, and therefore the pore-forming agent is positively removed by burning in the calcination step, so that the pores can be positively formed, thus enhancing the operation efficiency, the productivity and the mass-productivity.

[Second Embodiment]

Figure 4:
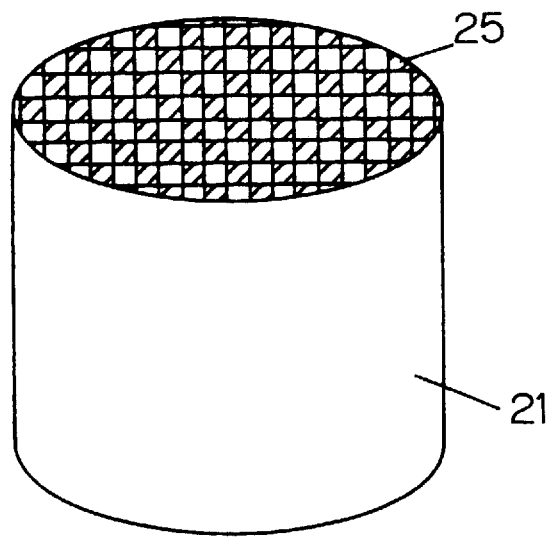
FIG. 4 is a perspective view of an exhaust gas filter according to one example of a second embodiment.
Figure 5:
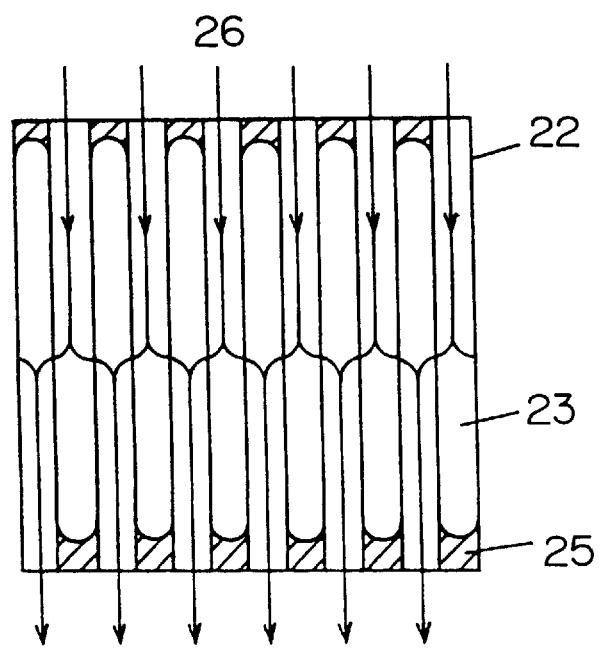
FIG. 5 is an enlarged, cross-sectional view showing a lattice of the exhaust gas filter of FIG. 4.
Figure 6:
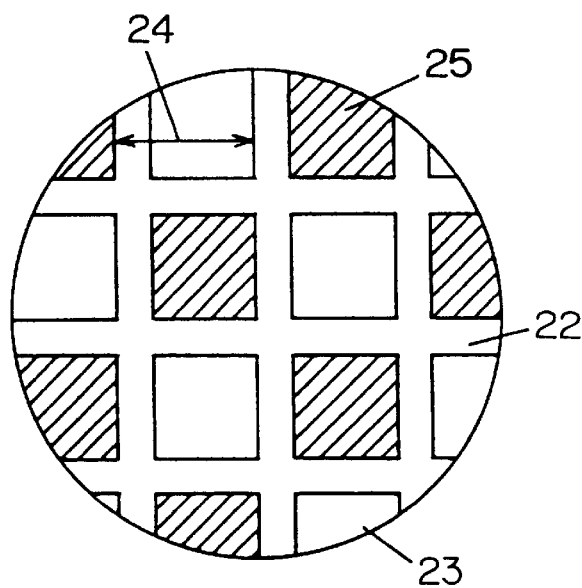
FIG. 6 is an enlarged, cross-sectional view showing the lattice of the exhaust gas filter of FIG. 4 closed by a closure material.

A preferred embodiment of an exhaust gas filter of the invention, as well as a method of producing the same, will now be described. FIG. 4 is a perspective view of the exhaust gas filter according to one example of a second embodiment, FIG. 5 is an enlarged, cross-sectional view showing a lattice of the exhaust gas filter of one example according to the present invention, and FIG. 6 is an enlarged, cross-sectional view showing the partially-closed lattice of the exhaust gas filter of one example according to the present invention. In FIGS. 4 and 5, reference numeral 21 denotes a honeycomb columnar body constituting the exhaust gas filter, and this honeycomb columnar body 21 includes the lattice 22, lattice holes (spaces) 23, and closure portions or members 25. Reference numeral 24 denotes the pitch of partition walls of the lattice 22. Reference numeral 26 denotes a direction of flow of exhaust gas. Pores, formed in the lattice 22, collects or arrests particulate matter contained in the exhaust gas. A large number of pores are formed in the honeycomb columnar body 21. The lattice hole 23 has a square shape, but may have any other suitable shape such as a hexagonal shape, a polygonal shape and a circular shape.

With respect to the dimensions of the honeycomb columnar body 21 of this embodiment formed by extrusion, the diameter of the cylinder (cylindrical body) is 144 mm, the thickness of the partition wall of the lattice 22 is 0.4 mm, the pitch 24 between the lattice holes 23 is 4 mm, and the length of the cylinder is 155 mm. The same material as that of the honeycomb structural member is filled in one end of the lattice holes 23 of the honeycomb columnar body 21 in a pattern shown in FIG. 6 along the length of the cylindrical body to form the closure portions 25, the length of each closure portion 25 being 7 to 10 mm. The same material is filled in the other end of the lattice holes 23, having no closure portion 25 at their one ends, in a similar pattern to form the closure portions 25.

For explaining the structure of the exhaust gas filter of the invention, powder particles, comprising aluminum titanate as a main component, will first be described.

In this embodiment, two kinds of powders are used, and the particle shape is columnar. In the extrusion for shaping, longitudinal axes of these columnar particles tend to be oriented in the extruding direction, and therefore thermal expansion of the exhaust gas filter in the extruding direction depends on thermal expansion of the columnar particles in their longitudinal direction. Therefore, if the longitudinal direction of the columnar particles is the direction of positive thermal expansion, the direction of extruding of the exhaust gas filter is the direction of positive thermal expansion. In contrast, if the longitudinal direction of the columnar particles is the direction of negative thermal expansion, the direction of extruding of the exhaust gas filter is the direction of negative thermal expansion. Two kinds of powders, in which grains grew with the a-axis or the c-axis of the crystal of aluminum titanate oriented in the columnar direction, was actually obtained, and therefore these powders were used in this embodiment. In order to average the particle size of the two kinds of powders, each powder was adjusted into an average particle size of about 10 μm by pulverizing.

TABLE 3

| No. | Aluminum titanate Kind* | Aluminum titanate Particle size (μm) | Pore-forming agent powder Particle size (μm) | Pore-forming agent powder Addition amount (wt. part) | Thermal expansion coefficient (× 10⁻⁶ C.⁻¹) Extruding direction αa | Thermal expansion coefficient (× 10⁻⁶ C.⁻¹) Perpendicular direction αb | Pressure loss (mmaq.) | Number of regeneration (times) |
|---|---|---|---|---|---|---|---|---|
| 1 | A | 10 | 61 | 20 | 1.3 | −1.3 / −1.2 | 960 | 100 |
| 2 | A | 10 | 42 | 20 | 2.4 | −2.3 / −2.3 | 1010 | 100 |
| 3 | B | 10 | 61 | 20 | −1.3 | 1.3 / 1.3 | 950 | 100 |
| 4 | B | 10 | 42 | 20 | −2.3 | 2.4 / 2.3 | 990 | 100 |
| 5 | A | 10 | 25 | 20 | 3.2 | −3.2 / −3.2 | 1120 | 32 |
| 6 | B | 10 | 25 | 20 | −3.2 | 3.1 / 3.2 | 1140 | 44 |
| 7 | C | 10 | 61 | 20 | 1.6 | 1.8 / 1.8 | 910 | 21 |

*Kind of aluminum titanate
A: Longitudinal direction of columnar particle is a-axis
B: Longitudinal direction of columnar particle is c-axis
C: Not columnar particle With respect to specimens 1 and 2, the powder, comprising aluminum titanate as a main component, is such that grains grew with the a-axis of the crystal of the aluminum titanate oriented in the columnar direction, and this kind is indicated by A in Table 3. With respect to specimens 3 and 4, grains grew with the c-axis of the crystal of the aluminum titanate oriented in the columnar direction, and this kind is indicated by B in Table 3.

In this embodiment, the powder, comprising aluminum titanate as a primary component, has the average particle size of about or around 10 μm, and if the average particle size is too small (not more than about 3 μm), the contraction by calcination becomes extremely high, so that the honeycomb columnar body 21 is deformed. In contrast, if the average particle size is too large (not less than about 25 μm), the combustion reaction by the calcination becomes poor, so that the strength of the honeycomb columnar body 21 is lowered. For these reasons, the average particle size is set to around 10 μm which is in the range of several μm less than 10 μm and several μm more than 10 μm. The average particle size was measured using a laser particle size distribution measurement device.

Next, a production method in this embodiment will now be described. As shown in specimens 1 to 4 of Table 3, 100 parts by weight of powder, comprising aluminum titanate as a main component, and having an average particle size of around 10 μm, 20 parts by weight of pore-forming agent powder having an average particle size of 61 μm (42 μm), 8 to 10 parts by weight of a binder, 3 to 5 parts by weight of a plasticizer, and 26 to 31 parts by weight of water were mixed and kneaded by a mixer and a kneader. Here, resin powder was used as the pore-forming agent powder, and methyl cellulose was used as the binder, and glycerin was used as the plasticizer.

Then, the kneaded material was charged into a vacuum extruder, and was extruded into a configuration similar to that of the honeycomb columnar body 21. Then, this extruded product was dried, closure members 25 were alternately filled in lattice holes 23 at each of opposite ends of the extruded product. Then, in a calcination furnace, the extruded product was treated or heated at a temperature rise rate of 5° C./hour in such a temperature range that the pore-forming agent powder was decomposed and oxidized, and then was further heated to a calcination temperature of 1,500° C. to sinter the extruded product, thereby producing an exhaust gas filter.

The honeycomb columnar body 21 of this embodiment, produced by the above method, has pores formed as a result of removal of the pore-forming agent powder by burning, and the honeycomb columnar body 21 has an average pore diameter of 15 to 24 μm, a porosity of 41% to 46%. The average pore diameter and the porosity were measured using a mercury porosimeter.

In order to examine the orientation of the powder particles, comprising aluminum titanate as a main component, and a thermal shock resistance level for an exhaust gas filter, specimens 1 to 4 of this embodiment, as well as Samples 5 to 7 (Comparative Examples also prepared), were tested.

Specimens 5 to 7 (Comparative Examples) were produced according to a procedure basically similar to the production method of this embodiment. However, in specimens 5 and 6, resin powder, having an average particle size of 25 μm, was used as a pore-forming agent powder, and in specimen 7, although there was used powder comprising aluminum titanate as a primary component, the shape of particles thereof was not columnar, but generally rounded. This powder was also adjusted into the average particle size of about 10 μm by pulverizing, and this kind is indicated by C in Table 3.

Results of the test of the Examples of the invention and the Comparative Examples will be described below.

Reference is first made to the thermal expansion coefficient.

The thermal expansion coefficient of the honeycomb columnar body 21 of each specimen in the extruding direction, as well as the thermal expansion coefficient thereof in a direction (hereinafter referred to as "perpendicular direction") perpendicular to the extruding direction, was measured in the range of from room temperature to 800° C. With respect to the thermal expansion coefficient in the perpendicular direction, data, obtained by measuring it in two different directions perpendicular to the extruding direction, are shown in Table 3. With respect to specimens 1 and 2, the thermal expansion coefficient in the extruding direction (in the direction of inflow and outflow of the exhaust gas) is $1.3~2.4\times10^{-6}$ °C.$^{-1}$, and the thermal expansion coefficient in the perpendicular direction $-2.3~1.3\times10^{-6}$ °C.$^{-1}$. With respect to specimens 3 and 4, the thermal expansion coefficient in the extruding direction is $-2.3~1.3\times10^{-6}$ °C.$^{-1}$, and the thermal expansion coefficient in the perpendicular direction is $1.3~2.4\times10^{-6}$ °C.$^{-1}$. With respect to specimens 6 and 7, the absolute value of the thermal expansion coefficient both in the extruding direction and the perpendicular direction is as high as about $3.2\times10^{-6}$ °C.$^{-1}$. By using the powder, comprising aluminum titanate as a primary component and having the columnar particles, the a-axis or the c-axis of the crystal grains is oriented in the extruding direction, so that the thermal expansion coefficient in the direction perpendicular to the extruding direction is determined to be positive or negative. The thermal expansion coefficient tends to decrease with the increase of the particle size of the pore-forming agent powder. The reason for this is that the powder, comprising aluminum titanate as a primary component, has the average particle size of about 10 μm, and the pore-forming agent powder, larger in particle size than this aluminum titanate powder, absorbs a shearing force produced by the extruding pressure, thereby suppressing the orientation of the aluminum titanate powder.

With respect to specimens 7 (Comparative Example), the thermal expansion coefficient in the extruding direction is $1.6\times10^{-6}$ °C.$^{-1}$, and the thermal expansion coefficient in the perpendicular direction is $1.8\times10^{-6}$ °C.$^{-1}$. Thus, specimen 7 exhibited the positive thermal expansion coefficient both in the extruding direction and the perpendicular direction as is different from specimens 1 to 6. The reason for this is that the particles of the powder, comprising aluminum titanate as a primary component, are not columnar, and do not basically exhibit orientation.

Next, the pressure loss will be described.

The pressure loss was measured using a collection regeneration test device. Referring to the construction of the collection regeneration test device (not shown), a hot air-generating portion and an acetylene carbon-spraying portion were provided at a collection inlet side, and an electric heater portion for burning acetylene carbon (which was used instead of particulate matter), an air supply portion, and a smoke meter portion (for detecting the amount of leakage of the acetylene carbon) were provided at a collection outlet side. Further, a temperature measurement portion, having a thermocouple inserted in the lattice hole 23, was provided, and a pressure measurement portion for measuring a pressure difference between the collection inlet side and the collection outlet side was provided. With respect to a collection method, after the temperature within the honeycomb columnar body 21 was stably maintained at about 300° C. by a blast of hot air, about 25 g of acetylene carbon was collected for 30 minutes, and therefore 10 g of acetylene carbon per liter of the volume of the exhaust gas filter was collected. In this embodiment, the pressure loss was defined by the pressure difference between the collection inlet side and the collection outlet side immediately before the collecting operation was finished. As shown in Table 3, the pressure loss of specimens 1 to 7 was 910 to 1,140 mmaq, and was within a practically-usable range in this embodiment.

Next, the number of regenerations will be described.

For regenerating the exhaust gas filter, the acetylene carbon, collected by the above collection regeneration test device, was burned by an electric heater. This collection-burning operation was determined as one cycle of the regeneration, and this cycle was repeated, and that time when the value of the smoke meter reached an extremely high level was determined as the regeneration limit (that is, the expiration of the lifetime). The thermal shock resistance was determined by this regeneration limit. When the number of regenerations reached 100 times, the test was finished judging that the exhaust gas filter had a sufficient thermal shock resistance. Results are shown in Table 3.

In specimens 1 to 4, the number of regenerations reached 100 times, and these specimens have good thermal shock resistance. The reason for this will be described below. As described above, the thermal expansion coefficient of specimens 1 to 4 in the extruding direction is $1.3 \sim 2.4 \times 10^{-6}$ °C.$^{-1}$ or $-2.3 \sim -1.3 \times 10^{-6}$ °C.$^{-1}$, and the thermal expansion coefficient thereof in the two directions perpendicular to the extruding direction is $-2.3 \sim 1.3 \times 10^{-6}$ °C.$^{-1}$ or $1.3 \sim 2.4 \times 10^{-6}$ °C.$^{-1}$. Thus, the thermal expansion coefficients in the extruding direction and the perpendicular direction exhibit opposite positive and negative (or negative and positive) values, and besides the absolute value of the thermal expansion coefficient is small on the order of not more than $2.4 \times 10^{-6}$ °C.$^{-1}$. For example, with respect to specimen 2, the difference between the thermal expansion coefficient in the extruding direction and the thermal expansion coefficient in the direction perpendicular to the extruding direction is about $4.7 \times 10^{-6}$ °C.$^{-1}$, and in this case a stress, acting between the particles during thermal expansion and thermal contraction, is not so large. The reason for this is that the expansion occurs in the extruding direction. And the contraction occurs in the perpendicular direction, and therefore the interval between the particles is not so varied. Thus, the particles are oriented in the extruding direction or the perpendicular direction, thereby suppressing the particles, a of a crack between the particles, and therefore the rate of decrease of the strength of the exhaust gas filter can be greatly retarded. The thermal expansion coefficient of specimen 7 is not more than $1.8 \times 10^{-6}$ °C.$^{-1}$, and its values in the two directions perpendicular to the extruding direction are the same positive values. In this case, a stress, acting between the particles during thermal expansion and thermal contraction, is large.

The reason for this will be described below.

A crack is most liable to develop in an exhaust gas filter when particulate matter in the exhaust gas filter causes localized abnormal combustion. When localized abnormal combustion occurs in an exhaust gas filter whose thermal expansion coefficients in an extruding direction and a direction perpendicular thereto are both positive in value, ceramics substrate particles at a high-temperature portion expand in the extruding direction and the perpendicular direction, so that the interval between the ceramics substrate particles tend to become larger. In the exhaust gas filter of the present invention, however, when the positive thermal expansion occurs in the extruding direction, the negative thermal expansion occurs in the perpendicular direction, or when the negative thermal expansion occurs in the extruding direction, the positive thermal expansion occurs in the perpendicular direction. Therefore, the interval between the particles on the ceramic substrate is not so increased. Therefore, a stress acting between the particles is extremely smaller in the exhaust gas filter of the invention.

Although not shown in this embodiment, when the thermal expansion coefficient in the extruding direction is $0 \sim 1.3 \times 10^6$ °C.$^{-1}$ whereas the thermal expansion coefficient in the direction perpendicular to the extruding direction is $-1.3 \sim 0 \times 10^{-6}$ °C.$^{-1}$, or when the thermal expansion coefficient in the extruding direction is $-1.3 \sim 0 \times 10^{-6}$ °C.$^{-1}$ whereas the thermal expansion coefficient in the direction perpendicular to the extruding direction is $0 \sim 1.3 \times 10^{-6}$ °C.$^{-1}$, a sufficient thermal shock resistance is achieved. It is thought that the reason for this is that if the thermal expansion coefficients in the extruding direction and the perpendicular direction have opposite positive and negative (or negative and positive) values, a stress, acting between the particles during thermal expansion and thermal contraction, is small.

As will be appreciated from the above test results, in the exhaust gas filter of this embodiment, when the columnar particles (having the particle size of around 10 μm) of the powder, comprising aluminum titanate as a primary component, and the pore-forming agent powder are subjected to a shearing force produced by the pressure developing during the extruding operation, the pore-forming agent powder, having the average particle size of 42 to 61 μm, absorbs this shearing force to a certain degree, so that the powder, comprising aluminum titanate as a primary component, is less liable to be sheared, and has good orientation. With this orientation, the thermal expansion coefficient is kept to within the range of $-2.3 \sim 2.4 \times 10^{-6}$ °C.$^{-1}$, thereby enhancing the thermal shock resistance. And besides, since the ceramics substrate comprises aluminum titanate as a primary component, there is a very small possibility of melting damage due to abnormal combustion, and the excellent heat resistance is achieved.

[Third Embodiment]

A preferred embodiment of the present invention will now be described with reference to the drawings.

(EXAMPLE 1)

Aluminum titanate, composed of a mixture of equimolar amounts of aluminum oxide and titanium dioxide, was blended selectively with $SiO_2$, $Fe_2O_3$, $Al_2O_3$, $TiO_2$, MgO and CaO in the ratios shown in Table 4, and each blend was mixed for 60 minutes by an alumina pulverizer (manufactured by Nitto Kagaku Corporation and sold under the tradename of ANM200WES) to form mixture powder (hereinafter referred to as "aluminum titanate mixture powder") comprising aluminum titanate as a primary component.

TABLE 4

| | Blend ratio (wt. part) | | | | | | |
|---|---|---|---|---|---|---|---|
| Run No. | Aluminum titanate | $SiO_2$ | $Fe_2O_3$ | $Al_2O_3$ | $TiO_2$ | MgO | CaO |
| 1 | 100 | 1.0 | 1.0 | — | — | — | — |
| 2 | 100 | 1.0 | 2.0 | — | — | — | — |
| 3 | 100 | 5.2 | 2.0 | — | — | — | — |
| 4 | 100 | 1.0 | 1.0 | 2.0 | — | — | — |
| 5 | 100 | — | 2.0 | — | 2.0 | 1.0 | — |
| 6 | 100 | — | 1.0 | — | — | 2.0 | 2.0 |
| 7 | 100 | 1.5 | — | 1.5 | — | — | 2.5 |
| 8 | 100 | — | — | — | 1.0 | 1.5 | 0.5 |
| 9 | 100 | 5.0 | 4.5 | — | 3.0 | — | — |
| 10 | 100 | — | — | 10.0 | — | 5.0 | 5.0 |
| 11 | 100 | — | — | 0.5 | 0.5 | 1.0 | 0.5 |
| 12 | 100 | — | 0.5 | 1.0 | 1.0 | — | 1.0 |
| 13 | 100 | 0.5 | — | — | 0.5 | 0.5 | — |

12 parts by weight of a 10% polyvinyl alcohol solution was added to 100 parts by weight of each of the thus obtained aluminum titanate mixture powders (or aluminum titanate mixture powder obtained by pre-calcining the thus obtained aluminum titanate mixture powder for 2 hours at 1,200° C., and then by pulverizing it by an alumina pulverizer (manufactured by Nitto Kagaku Corporation and sold under the tradename of ANM200WES)), and then these were mixed together in a mortar made of alumina to form particle powder. Then, the thus obtained particle powder was shaped or molded under a pressure of 800 kg/cm$^2$ to form a disk-like molded product (or compact) having a diameter of 30.0 mm and a thickness (t) of 4 to 6 mm. Then, the molded product was calcined at a temperature in the range of 1,450° to 1,550° C. to form a sintered product. Each sintered product thus obtained was worked by a diamond cutter into a specimen of a square pillar-shape (for measurement of thermal expansion coefficients) having one width (a) of 3 to 5 mm, the other width (b) of 3 to 5 mm and a height (h) of 10 to 20 mm. Then, the thermal expansion coefficient of each specimen thus obtained was measured at temperatures of 30° to 800° C., using a thermal expansion meter. Also, each specimen was heat treated at 1,000° to 1,200° C. for 200 hours, and then the thermal expansion coefficient at 30° to 800° C. was measured. Results thereof are shown in Table 5.

TABLE 5

| Run No. | Thermal Expansion coefficient ($10^{-6}$/°C.) | Thermal expansion coefficient after heat treatment (1000° C./ 200 hours) ($10^{-6}$/°C.) | Thermal expansion coefficient after heat treatment (1100° C./ 200 hours) ($10^{-6}$/°C.) | Thermal expansion coefficient after heat treatment (1200° C./ 200 hours) ($10^{-6}$/°C.) |
| --- | --- | --- | --- | --- |
| 1  | 0.1 | 0.3 | 0.5 | 0.5 |
| 2  | 0.1 | 0.2 | 0.4 | 0.4 |
| 3  | 0.3 | 0.9 | 1.1 | 1.0 |
| 4  | 0.1 | 0.3 | 1.0 | 0.8 |
| 5  | 0.3 | 0.5 | 0.8 | 0.6 |
| 6  | 0.4 | 0.6 | 0.8 | 0.7 |
| 7  | 0.5 | 0.8 | 1.1 | 0.9 |
| 8  | 0.7 | 0.9 | 1.2 | 0.9 |
| 9  | 0.6 | 0.7 | 1.1 | 0.9 |
| 10 | 0.8 | 1.0 | 1.2 | 1.0 |
| 11 | 0.7 | 0.9 | 1.2 | 1.1 |
| 12 | 0.8 | 1.1 | 1.2 | 1.2 |
| 13 | 0.4 | 0.8 | 0.9 | 1.0 |

As is clear from Table 5, with respect to the low-thermal expansion materials of this Example, the thermal expansion coefficient at 30° to 800° C. is not more than 0.8×10$^{-6}$ °C., and the thermal expansion coefficient of the low-thermal expansion materials, heat treated at 1,000° to 1,200° C. for 200 hours, is not more than 1.2×10$^6$ °C. at 30° to 800° C. A heat-resistant test of the low-thermal expansion materials of this Example was conducted in an electric furnace, and it has been found that these materials can withstand the temperature of 1,400° C.

As described above, in this Example, there can be obtained the low-thermal expansion materials which are low in thermal expansion coefficient, have a high thermal resistance, and are not increased in thermal expansion coefficient after the long-term heat treatment, thus exhibiting excellent thermal shock resistance. The aluminum titanate compound need only to contain at least two of $SiO_2$, $Fe_2O_3$, $Al_2O_3$, $TiO_2$, MgO and CaO in so far as the properties of the aluminum titanate compound are not adversely affected.

(EXAMPLE 2)

Figure 7:
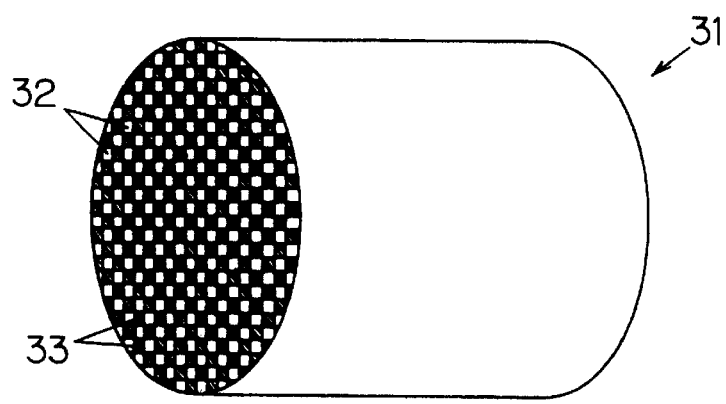
FIG. 7 is a perspective view showing the appearance of an exhaust gas filter according to Example 2 of a third embodiment.
Figure 8:
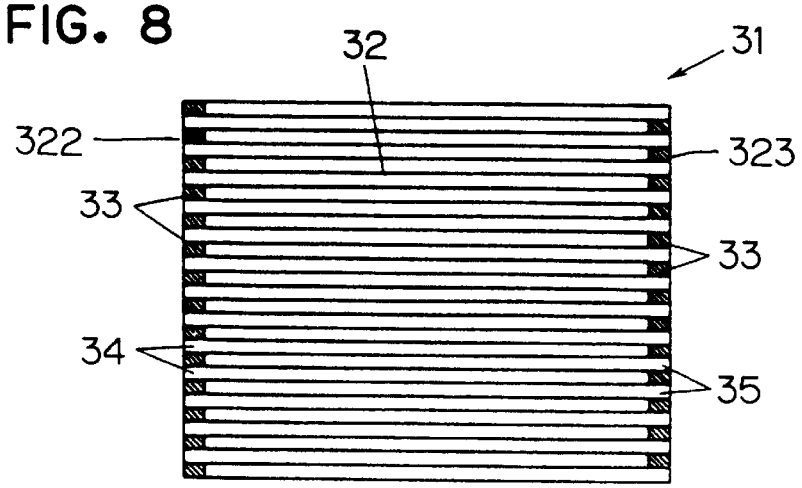
FIG. 8 is a cross-sectional view of an essential part of the exhaust gas filter according to Example 2 of the third embodiment.

FIG. 7 is a perspective view showing the appearance of an exhaust gas filter of Example 2 of the invention, and FIG. 8 is a cross-sectional view showing an essential part of this exhaust gas filter. Reference numeral 31 denotes the exhaust gas filter of Example 2 of the invention, reference numeral 32 a cell, reference numeral 33 a closure portion or member, reference numeral 34 an exhaust gas inlet port, and reference numeral 35 a purified gas outlet port. As is clear from FIGS. 7 and 8, the exhaust gas filter of this Example has a columnar configuration, and includes a number of cells 32 formed therein and extending from an exhaust gas inlet side 322 to an exhaust gas outlet side in the axial direction. The cells 32 are closed alternately by the closure members 33 at each of the exhaust gas inlet side 322 and the outlet side 323, and in other words each of the cells 32 is closed at one of the opposite ends thereof.

A method of producing the exhaust gas filter of this Example having the above construction will now be described. A low-thermal expansion material, comprising aluminum titanate compound comprising 100 parts by weight of aluminum titanate, 5.2 parts by weight of $SiO_2$ and 2 parts by weight of $Fe_2O_3$, a methyl cellulose binder, a polymeric ester lubricant, a polyolefin pore-forming agent, and water were blended together in the ratio shown in Table 6, and this blend was mixed for 3 minutes by a high-speed mixer (manufactured by Miyazaki Tekko Corporation and sold under the tradename of MHS-165), and then this mixture was kneaded for 30 to 120 minutes by a kneader (manufactured by Miyazaki Tekko Corporation and sold under the tradename of MP-100-1) to form a bulk material (that is, a lump of kneaded material) for extrusion purpose.

TABLE 6

|  | Blend ratio (wt. part) |
| --- | --- |
| Low-thermal expansion material | 100 |
| Binder | 15 |
| Lubricant | 3 |
| Pore-forming agent | 30 |
| Water | 25 |

Using a vacuum extruder (manufactured by Miyazaki Tekko Corporation and sold under the tradename of MV-FM-A-1), the thus obtained bulk material was formed into an columnar extruded product (having a diameter of 170 mm and a height (h) of 180 mm) having a number of cells extending in an axial direction. Then, the extruded product was dried at 80° to 100° C. for 24 hours by a dryer (manufactured by Yamato Corporation and sold under the tradename of DF61). Then, using an electric furnace (manufactured by Motoyama Corporation and sold under the tradename of vertically-movable type kanthal super furnace), the dried extruded product was calcined at a temperature in the range of 1,450° to 1,550° C. to form a sintered product, and the cells of the sintered product were alternately closed by the closure members at each of the opposite ends thereof, thereby preparing the exhaust gas filter 31 of this Example shown in FIG. 7.

With respect to the low-thermal expansion materials of this Example, the thermal expansion coefficient at 30° to 800° C. is 0.1×10$^{-6}$~0.8×10$^{-6}$/°C., and the thermal expansion coefficient of the low-thermal expansion materials, heat treated at 1,000° to 1,200° C. for 200 hours, is 0.5×10$^{-6}$1.2× 10$^{-6}$/°C. at 30° to 800° C. A heat-resistant test of the low-thermal expansion materials of this Example was conducted in an electric furnace, and it has been found that these materials can withstand the temperature of 1,400° C. ±50° C.

As described above, in this Example, there can be obtained the exhaust gas filter which has a low thermal expansion coefficient, has a high thermal resistance, and is not increased in thermal expansion coefficient after the long-term heat treatment, thus exhibiting excellent thermal shock resistance. In this Example, the aluminum titanate compound need only to contain at least two of $SiO_2$, $Fe_2O_3$, $Al_2O_3$, $TiO_2$, MgO and CaO in so far as the properties of the aluminum titanate compound are not adversely affected.

[Fourth Embodiment]

Examples of the invention as well as a production method will now be described with reference to the drawings.

(EXAMPLE 1)

Figure 9:
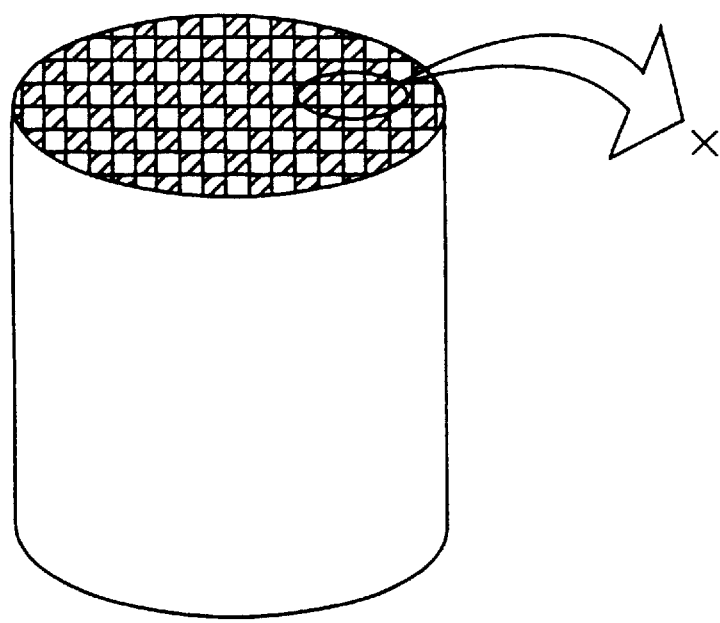
FIG. 9 is a perspective view showing the whole of an exhaust gas filter according to Example 1 of a fourth embodiment.
Figure 10:
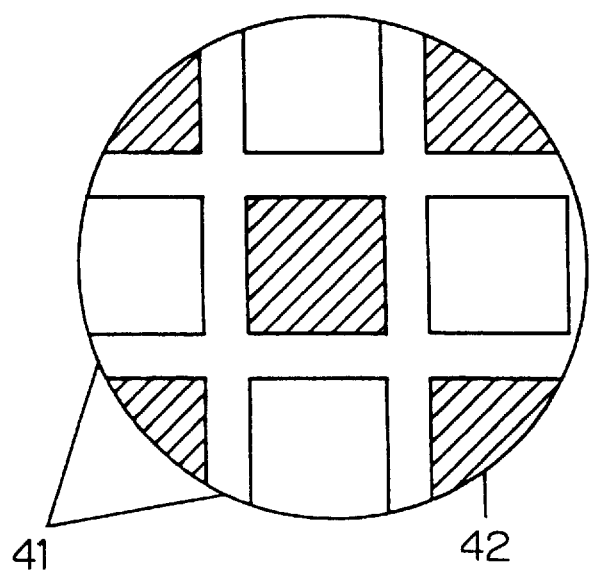
FIG. 10 is an enlarged view of a portion X of FIG. 9.
Figure 11:
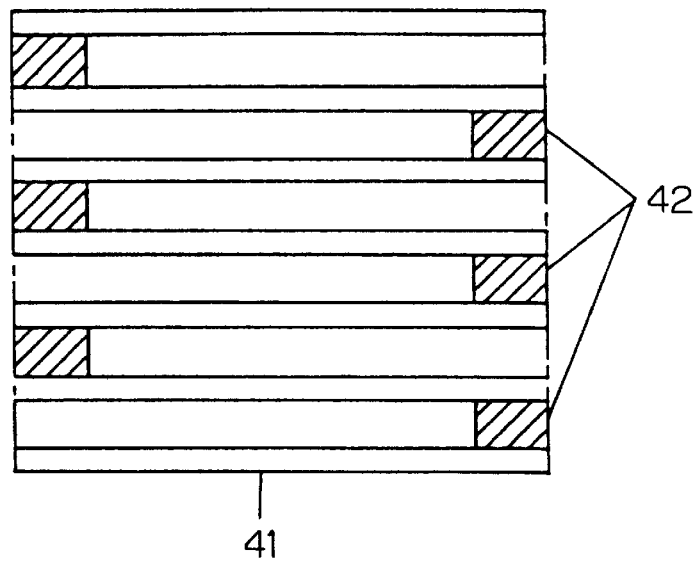
FIG. 11 is a view showing a filter structure of the exhaust gas filter according to Example 1 of the fourth embodiment.

FIG. 9 is a perspective view showing the whole of a diesel engine exhaust gas filter of Example 1 of the invention, FIG. 10 is an enlarged view of an essential part of this exhaust gas filter, and FIG. 11 is a view showing a filter structure of this exhaust gas filter. Reference numeral 41 denotes a cell wall of a honeycomb structural member made of aluminum titanate, and reference numeral 42 denotes a seal material.

A method of producing the diesel engine exhaust gas filter of this Example will now be described.

100 parts by weight of powder, comprising aluminum titanate as a primary component, 20 parts by weight of pore-forming agent powder, such as granular polyethylene or granular activated carbon, and 7 to 12 parts by weight of a binder for binding the aluminum titanate powder and the pore-forming agent powder together, were blended together, and were dry kneaded by a mixer.

Then, 3 to 6 parts by weight of organic plasticizer and 31 to 38 parts by weight of water were added to the above mixture, and this specimen was kneaded by a kneader and further by three rollers. The binder, the plasticizer and the water are added for easily forming an extruded honeycomb product (described later). This specimen was charged into a vacuum extruder, and was formed into an extruded honeycomb product serving as a diesel engine exhaust gas filter, and this extruded honeycomb product was dried. Then, the seal material 42, comprising aluminum titanate as a primary component, was sealed in the cells at the opposite ends of the filter in a checkered pattern as shown in FIGS. 9 and 10, thereby producing the filter-like extruded product. This extruded product, together with the seal material, was sintered at 1,500° C. to provide a diesel engine exhaust gas filter having a porosity of about 40%, a cell thickness of 0.3 mm, a diameter of 5.66 inch and a length of 6 inch. At this time, abrupt contraction and deformation strain were not encountered.

(EXAMPLES 2 to 9)

According to the same procedure as described for Example 1, an extruded honeycomb product, comprising aluminum titanate as a main component, was prepared, and the extruded honeycomb product was calcined at 1,500° C. to provide a honeycomb structural member. Then, the seal material 42, comprising aluminum titanate as a main component, was sealed in cells at opposite ends of the filter as in Example 1, and this extruded honeycomb product was heat treated at 1,500° C. for several tens of minutes to provide a diesel engine exhaust gas filter of Example 2 having a cell thickness of 0.3 mm, a diameter of 5.66 inch and a length of 6 inch. Deformation and strain due to the above two heat treatments were not encountered.

Next, according to the same procedure as described for Example 2, six honeycomb structural members were prepared. As main components of the seal material, there were prepared powder of aluminum titanate having a thermal expansion coefficient of $0.5 \times 10^{-6}$ °C., powder of cordierite having a thermal expansion coefficient of $1.5 \times 10^{-6}$/°C., and powder of mullite having a thermal expansion coefficient of $4.0 \times 10^{-6}$/°C. Incidentally, in the case of an electric heat regeneration method, the temperature of the end faces of the exhaust gas filter (at which the seal material is provided) will not become high, that is, will not exceed 800° C., and there is no problem if a heat-resistance, low-thermal expansion material other than aluminum titanate is used. 100 parts by weight of one or two of these powders and 10 parts by weight of silica sol (inorganic binder) were mixed so that the thermal expansion coefficients of the respective seal materials subjected to a heat treatment (800° C.) will be $0.9 \times 10^{-6}$/°C., $1.1 \times 10^{-6}$/°C., $1.3 \times 10^{-6}$/°C., $1.5 \times 10^{-6}$/°C., $1.7 \times 10^{-6}$/°C. and $2.2 \times 10^{-6}$/°C. These blend ratios and these thermal expansion coefficients are shown in Table 7. These correspond to Examples 3 to 8, respectively.

TABLE 7

| Example No. | 3 | 4 | 5 | 6 | 7 | 8 |
|---|---|---|---|---|---|---|
| Aluminum titanate (wt. part) | 65 | 45 | 25 | — | — | — |
| Cordierite (wt. part) | 35 | 55 | 75 | 100 | 90 | 75 |
| Mullite (wt. part) | — | — | — | — | 10 | 25 |
| Thermal expansion coefficient $\alpha P$ ($\times 10^{-6}$/°C.) | 0.92 | 1.09 | 1.28 | 1.51 | 1.67 | 2.25 |

The seal materials of the above compositions were sealed in the above six honeycomb structural members, respectively, and each of the seal materials was bound by a heat treatment (800° C.) with the aid of the silica sol added in an amount of 10 parts by weight. Thus, six diesel engine exhaust gas filters were obtained, each of these exhaust gas filter having a cell thickness of 0.3 mm, a diameter of 5.66 inch and a length of 6 inch. In the filter of Example 8, cracks were found at the interface between the cell wall and the seal material after the heat treatment.

In Example 9, a combustion regeneration test for the diesel engine exhaust gas filters of Examples 1 to 8 was conducted. An engine used in the test had a displacement of about 3,500 cc, and carbon particulate was produced at an engine speed of 1,500 rpm with a torque of 21 kg.m, and using the diesel engine exhaust gas filter of each of the Examples, 5.0 g of carbon particulate per liter was collected or arrested. At this time, the exhaust gas purification rate was measured by a smoke meter provided at the rear side of the filter. The combustion regeneration of the filters was effected using an electric heater system. Next, the regeneration will be described. An output of a heater, provided at the front side of the filter, was continued to be increased until the front side of the filter was heated to about 600° C. so that the carbon particulate was ignited. After the carbon particulate was ignited, the heater was stopped, and the air was fed at a rate of about 100 L/min. by a blower, thereby propagating a flame. At this time, the temperature inside the filter was measured by nine (9) thermocouples inserted in predetermined positions in the cells. Whether or not cracks developed was judged from the appearance, a hammering test and the smoke meter provided at the rear side of the filter. About one hour and thirty minutes were spent for this sequence of collection and regeneration, and this cycle was repeated until same abnormal condition occurred in the filter. Results of this test are shown in Table 8.

TABLE 8

| Example No. | 1 | 2 | 3 | 4 | 5 | 6 | 7 | 8 |
|---|---|---|---|---|---|---|---|---|
| $\alpha H$ ($\times 10^{-6}$/°C.) | −1.30 | −1.30 | −1.29 | −1.31 | −1.32 | −1.28 | −1.30 | −1.31 |
| $\alpha P$ ($\times 10^{-6}$/°C.) | 0.50 | 0.70 | 0.92 | 1.09 | 1.28 | 1.51 | 1.67 | 2.25 |
| $\|\alpha H \cdot \alpha P\|$ ($\times 10^{-6}$/°C.) | 1.80 | 2.00 | 2.21 | 2.40 | 2.60 | 2.79 | 2.97 | 3.56 |
| Number of regenerations (when crack developed) | >500 | >500 | 450 | 401 | 373 | 352 | 212 | Crack developed during heat treatment |
| Maximum temperature during combustion (°C.) | 1,450 | 1,400 | 1.425 | 1.435 | 1,400 | 1,350 | 1,400 | — |

As will be appreciated from Table 8, when $|\alpha H-\alpha P|$ is in the range of between $2.0\times 10^{-6}$/°C. and $2.8\times 10^{-6}$/°C., any crack develops in the interface between the cell wall 41 and the seal material 42 even after the regeneration is effected 350 times. Further, when $|\alpha H-\alpha P|$ is not more than $2.0\times 10^{-6}$/°C., any crack develops in the interface between the cell wall 41 and the seal material 42 even after the regeneration is effected more than 500 times. It will also be appreciated that even if the maximum temperature exceeds 1,400° C., melting and melting damage do not occur. Therefore, the diesel engine exhaust gas filters of the present invention can be satisfactorily used as a purification filter for exhaust gas discharged from a diesel engine.

[Fifth Embodiment]

A preferred embodiment of an exhaust gas filter of the invention, as well as a method of producing the same, will now be described in detail.

(EXAMPLE 1)

Figure 12:
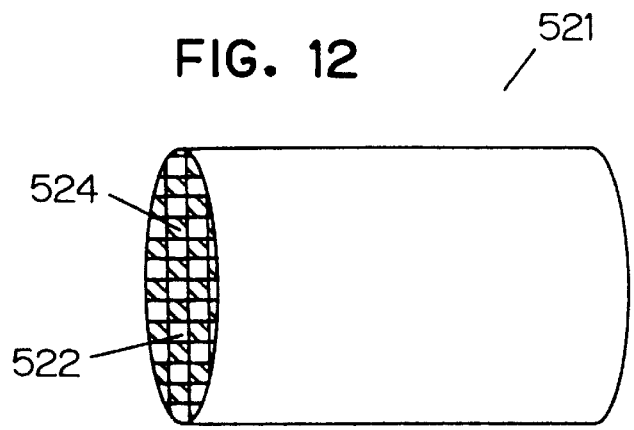
FIG. 12 is a perspective view showing the appearance of an exhaust gas filter according to Example 1 of a fifth embodiment.
Figure 13:
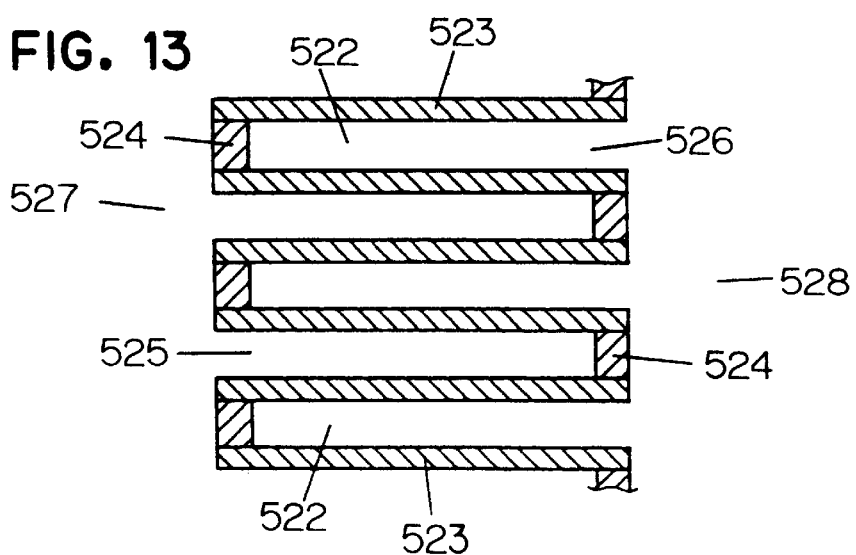
FIG. 13 is a cross-sectional view showing an essential part of the exhaust gas filter according to Example 1 of the fifth embodiment.

FIG. 12 is a perspective view showing the appearance of an exhaust gas filter of Example 1 of the invention, and FIG. 13 is a cross-sectional view showing of an essential part of this exhaust gas filter. Reference numeral 521 denotes the exhaust gas filter of Example 1 of the invention, reference numeral 522 cells, reference numeral 523 thin walls defining the cells 522, reference numeral 524 a closure material (or member), reference numeral 525 an exhaust gas inlet port, and reference numeral 526 an exhaust gas outlet port.

As is clear from FIGS. 12 and 13, the exhaust gas filter 521 of this Example has a columnar shape, and includes a number of cells 522 extending axially from an exhaust gas inlet side 527 to an exhaust gas outlet side 528. The cells 522 are closed alternately by the closure members 524 at each of the exhaust gas inlet side 527 and the outlet side 528, and in other words each of the cells 522 is closed at one of the opposite ends thereof.

A method of producing the exhaust gas filter 521 of this Example having the above construction will now be described. Aluminum titanate powder, comprising aluminum titanate as a primary component, a methyl cellulose binder, a polymeric ester lubricant, a polymeric, organic pore-forming agent, and water were blended together in the ratio shown in Table 9, and this blend was mixed for 3 minutes by a high-speed mixer, and then this mixture was kneaded for 30 to 120 minutes by a kneader to form a bulk material (that is, a lump of kneaded material) for extrusion purposes.

TABLE 9

| | Blend ratio (wt. part) |
|---|---|
| Aluminum titanate powder | 100 |
| Binder | 15 |
| Lubricant | 4 |
| Pore-forming agent | 17 |
| Water | 30 |

Then, by extruding the thus obtained bulk material by a vacuum extruder, a plurality of columnar extruded products (each having a number of axial cells 522, a diameter of 170 mm and a height of 180 mm) were formed, the thickness of a thin wall 523 of one columnar extruded product being different from that of another columnar extruded product. Then, each of the extruded products was dried at 80° to 100° C. for 24 hours. Then, the cells 522 were closed alternately by a closure material 524 at each of the opposite ends of each of the dried extruded products. Then, each of the extruded products was calcined at 1,480° to 1,520° C. to form a sintered product by an electric furnace, and the sintered product was finished to form an exhaust gas filter 521 (having a diameter of 140 mm and a height of 150 mm) of this Example shown in FIG. 12.

Then, with respect to the thus obtained exhaust gas filters 521, the relation between the thickness of the thin walls 523 (defining the cells 522), a tensile strength thereof in the axial direction, and a pressure loss was measured at the air-blasting rate of 400 cm/sec. Then, the measurement of the number of the cells, the measurement of the thermal expansion coefficient by a longitudinal thermal expansion meter, and the measurement of the average pore size and the porosity by a mercury porosimeter were effected. As a result, the number of the cells per cm2 in a cross-section perpendicular to the axis of the exhaust gas filter 521 of this Example was 49, and the average pore size of the filter body was 28 μm, and the porosity of the filter body was 53%. The thermal expansion coefficient in the axial direction in the range of from room temperature to 850° was $-1.2\times 10^{-6}$/°C., and thus had a minus value. The relation between the thickness of the thin wall 523 (defining the cells 522), the axial tensile strength thereof, and the pressure loss at the air-blasting rate of 400 cm/sec is shown in Table 10. Run No. marked with an asterisk "*" in Table 10 are out of the range of the present invention.

TABLE 10

| Run No. | Thickness of thin wall mm | Tensile strength in axial direction Kg/cm² | Pressure loss mm Aq (blast rate: 400 cm/sec) |
|---|---|---|---|
| 1* | 0.10 | 33.4 | 34 |
| 2* | 0.15 | 35.2 | 47 |
| 3 | 0.20 | 39.0 | 51 |
| 4 | 0.30 | 41.4 | 70 |
| 5 | 0.40 | 49.5 | 83 |
| 6 | 0.45 | 58.6 | 95 |
| 7 | 0.50 | 70.9 | 101 |
| 8 | 0.60 | 85.3 | 129 |
| 9 | 0.70 | 96.7 | 147 |
| 10* | 0.80 | 114.5 | 190 |

As is clear from Table 10, with respect to Run No. 3 to 9 according to the present invention, the wall thickness of the thin wall 523, defining the cells 522, is 0.2 to 0.7 mm. If the wall thickness is less than 0.2 mm, the axial tensile strength is reduced, and if the wall thickness is more than 0.7 mm, the pressure loss is increased. Further, a thermal resistance test of the exhaust gas filters 521 of this Example by an electric furnace, as well as a thermal shock resistance test thereof by a submerged quenching method, was conducted in comparison with a conventional cordierite honeycomb body, and the cordierite honeycomb body was completely melted at 1,440° C. whereas the exhaust gas filter 521 of this Example was not melted even at 1,500° C., and exhibited excellent thermal shock resistance.

As described above, in this Example, by suitably controlling the thickness of the thin walls 523 defining the cells 522, the exhaust gas filter 521 of this Example has the excellent filter characteristics, and by using aluminum titanate as a primary component of the filter body, the exhaust gas filter 521 has the low thermal expansion coefficient to achieve the excellent thermal shock resistance, and also has the excellent thermal resistance.

(EXAMPLE 2)

Aluminum titanate powder, comprising aluminum titanate as a primary component, a methyl cellulose binder, a polymeric ester lubricant, a polymeric, organic pore-forming agent, and water were blended together in the ratio shown in Table 11, and this blend was mixed for 3 minutes by a high-speed mixer, and then this mixture was kneaded for 30 to 120 minutes by a kneader to form a bulk material (that is, a lump of kneaded material) for extrusion purposes.

TABLE 11

| | Blend ratio (wt. part) |
|---|---|
| Aluminum titanate powder | 100 |
| Binder | 15 |
| Lubricant | 4 |
| Pore-forming agent | 37 |
| Water | 30 |

Then, by extruding the thus obtained bulk material by a vacuum extruder, a plurality of columnar extruded products (each having a number of axial cells 522, a diameter of 170 mm and a height of 180 mm) were formed, the thickness of a thin wall 523 of one columnar extruded product being different from that of another columnar extruded product. Then, each of the extruded products was dried at 80° to 100° C. for 24 hours. Then, the cells 522 were closed alternately by a closure material 524 (comprising aluminum titanate as a main component) at each of the opposite ends of each of the dried extruded products. Then, each of the extruded products was calcined at 1,480° to 1,520° C. by an electric furnace to form a sintered product, and the sintered product was finished to form an exhaust gas filter 521 (having a diameter of 140 mm and a height of 150 mm) of this Example.

Then, with respect to the exhaust gas filters 521 thus obtained as in Example 1, the relation between the thickness of the thin walls 523 (defining the cells 522), a tensile strength thereof in the axial direction, and a pressure loss was measured at the air-blasting rate of 400 cm/sec. Then, the measurement of the number of the cells, the measurement of the thermal expansion coefficient by a longitudinal thermal expansion meter, and the measurement of the average pore size and the porosity by a mercury porosimeter were effected. As a result, the number of the cells per cm² in a cross-section perpendicular to the axis of the exhaust gas filter 521 of this Example was 64, and the average pore size of the filter body was 41 μm, and the porosity of the filter body was 61%.

The thermal expansion coefficient in the axial direction in the range of from room temperature to 850° was $-1.0 \times 10^{-6}$/°C., and thus had a minus value. The relation between the thickness of the thin wall 523 (defining the cells 522 ), the axial tensile strength thereof, and the pressure loss at the air-blasting rate of 400 cm/sec is similar to that described above in Example 1. In the present invention, the wall thickness of the thin wall 523, defining the cells 522, is 0.2 to 0.7 mm. If the wall thickness is less than 0.2 mm, the axial tensile strength is reduced, and if the wall thickness is more than 0.7 mm, the pressure loss is increased. Further, in the exhaust gas filters 521 of this Example, both of the filter body and the closure material 534 comprised aluminum titanate as a primary component, and therefore the exhaust gas filter was not melted even at 1,500° C., and exhibited more excellent thermal shock resistance than that achieved in Example 1.

As described above, in this Example, by suitably controlling the thickness of the thin walls 523 defining the cells 522, the exhaust gas filter 521 of this Example has the excellent filter characteristics, and by using aluminum titanate as a primary component of each of the filter body and the closure material 524, the exhaust gas filter 521 has the low thermal expansion coefficient to achieve the excellent thermal shock resistance, and also has the excellent thermal resistance.

(EXAMPLE 3)

Aluminum titanate powder, comprising aluminum titanate as a main component, a methyl cellulose binder, a polymeric ester lubricant, a polymeric, organic pore-forming agent, and water were blended together in the ratio shown in Table 12, and this blend was mixed for 3 minutes by a high-speed mixer, and then this mixture was kneaded for 30 to 120 minutes by a kneader to form a bulk material (that is, a lump of kneaded material) for extrusion purposes.

TABLE 12

| | Blend ratio (wt. part) |
|---|---|
| Aluminum titanate powder | 100 |
| Binder | 15 |

TABLE 12-continued

|  | Blend ratio (wt. part) |
| --- | --- |
| Lubricant | 4 |
| Pore-forming agent | 10 |
| Water | 30 |

Then, by extruding the thus obtained bulk material by a vacuum extruder, a plurality of columnar extruded products (each having a number of axial cells 522, a diameter of 170 mm and a height of 180 mm) were formed, the number of cells 522 (per $cm^2$ in a cross-section perpendicular to the axis) of one columnar extruded product being different from that of another columnar extruded product. Then, each of the extruded products was dried at 80° to 100° C. for 24 hours. Then, the cells 522 were closed alternately by a closure material 524 at each of the opposite ends of each of the dried extruded products. Then, each of the extruded products was calcined at 1,480° to 1,520° C. by an electric furnace to form a sintered product, and the sintered product was finished to form an exhaust gas filter 521 (having a diameter of 140 mm and a height of 150 mm) of this Example.

Then, with respect to the exhaust gas filters 521 of this Example, the relation between the number of the cells per $cm^2$ in a cross-section perpendicular to the axis of the exhaust gas filter, a pressure loss was measured at the air-blasting rate of 400 cm/sec, and a collection efficient was measured. As a result, when the number of the cells per cm2 in the cross-section perpendicular to the axis was less than 4, the efficiency of collecting particulate matter in exhaust gas was lowered, and when this cell number was more than 81, the pressure loss, defined by the pressure difference between the exhaust gas inlet side 527 and the exhaust gas outlet side 528, was increased. Therefore, the number of the cells per $cm^2$ in the cross-section perpendicular to the axis of the exhaust gas filter 521 of the invention is 4 to 81.

With respect to the exhaust gas filters 521 of this Example, a thermal resistance test by an electric furnace and a thermal shock resistance test by a submerged quenching method were conducted in comparison with a conventional cordierite honeycomb body, as described in Examples 1 and 2. As a result, the cordierite honeycomb body was completely melted at 1,440° C. whereas the exhaust gas filter 521 of this Example was not melted even at 1,500° C., and exhibited excellent thermal shock resistance. The thermal expansion coefficient of the exhaust gas filter of this Example in the axial direction in the range of from room temperature to 850° C. was $-1.5 \times 10^{-6}/°C.$, and thus had a minus value.

As described above, in this Example, by suitably controlling the number of the cells per cm2 in the cross-section perpendicular to the axis of the exhaust gas filter 521, the exhaust gas filter 521 of this Example has the excellent filter characteristics, and by using aluminum titanate as a primary component of the filter body, the exhaust gas filter 521 has the low thermal expansion coefficient to achieve the excellent thermal shock resistance, and also has the excellent thermal resistance. Aluminum titanate may be used as a primary component of the closure material.

(EXAMPLE 4)

Aluminum titanate powder, comprising aluminum titanate as a primary component, a methyl cellulose binder, a polymeric ester lubricant, a polymeric, organic pore-forming agent, and water were blended together in ratios shown in Table 13, and each of these blends was mixed for 3 minutes by a high-speed mixer, and then this mixture was kneaded for 30 to 120 minutes by a kneader to form a bulk material (that is, a lump of kneaded material) for extrusion purposes.

TABLE 13

| Run No. | Aluminum titanate powder | Binder | Lubricant | Pore-forming agent | Water |
| --- | --- | --- | --- | --- | --- |
| 1 | 100 | 15 | 4 | 0.5 | 30 |
| 2 | 100 | 15 | 4 | 1.0 | 30 |
| 3 | 100 | 15 | 4 | 5.0 | 30 |
| 4 | 100 | 15 | 4 | 10.0 | 30 |
| 5 | 100 | 15 | 4 | 20.0 | 30 |
| 6 | 100 | 15 | 4 | 40.0 | 30 |
| 7 | 100 | 15 | 4 | 50.0 | 30 |
| 8 | 100 | 15 | 4 | 70.0 | 30 |
| 9 | 100 | 15 | 4 | 75.0 | 30 |
| 10 | 100 | 15 | 4 | 90.0 | 30 |

Then, by extruding the thus obtained bulk material by a vacuum extruder, a plurality of columnar extruded products (each having a number of axial cells 522, a diameter of 180 mm and a height of 190 mm) were formed, the amount of the pore-forming agent of one columnar extruded product being different from that of another columnar extruded product. Then, each of the extruded products was dried at 80° to 100° C. for 24 hours. Then, the cells 522 were closed alternately by a closure material 524 at each of the opposite ends of each of the dried extruded products. Then, each of the extruded products was calcined at 1,480° to 1,520° C. by an electric furnace to form a sintered product, and the sintered product was finished to form an exhaust gas filter 521 (having a diameter of 140 mm and a height of 150 mm) of this Example.

Then, with respect to the exhaust gas filters 521 of this Example, the porosity of the filter body was measured by a mercury porosimeter, a tensile strength in the axial direction was measured, and a pressure loss was measured at the air-blasting rate of 400 cm/sec, and the relation between these is shown in Table 14. Run Nos. marked with an asterisk "*" in Table 14 are out of the range of the present invention.

TABLE 14

| Run No. | Porosity % | Tensile strength kg/cm² | Pressure loss mm Aq (blast rate: 400 cm/sec) |
| --- | --- | --- | --- |
| 1* | 5 | 120.7 | 201 |
| 2* | 14 | 100.1 | 192 |
| 3 | 30 | 97.4 | 148 |
| 4 | 41 | 65.6 | 114 |
| 5 | 52 | 54.4 | 84 |
| 6 | 59 | 51.7 | 77 |
| 7 | 68 | 47.4 | 64 |
| 8 | 70 | 46.0 | 52 |
| 9* | 72 | 39.4 | 40 |
| 10* | 81 | 20.1 | 21 |

As is clear from Table 14, with respect to Run No. 3 to 7 of the invention, the porosity is 30 to 70%. If the porosity is less than 30%, the pressure loss increases, so that the efficiency of collecting particulate matter in exhaust gas is lowered. If the porosity is more than 70%, the tensile strength in the axial direction is reduced. With respect to Run No. 3 to 7 the invention, the average pore size is in the range from 1.0 to 35.0 μm. With respect to the gas filters 521 of this Example, a thermal resistance test by an electric furnace and a thermal shock resistance test by a submerged quenching method were conducted in comparison with a conventional cordierite honeycomb body, as described in Examples 1 and 2. As a result, the cordierite honeycomb body was completely melted at 1,440° C. whereas the exhaust gas filter 521 of this Example was not melted even at 1,500° C., and exhibited excellent thermal shock resistance. The thermal expansion coefficient of the exhaust gas filter of this Example in the axial direction in the range of from room temperature to 850° C. was $-1.7 \times 10^{-6}/°C.$, and thus had a minus value.

As described above, in this Example, by suitably controlling the porosity and the average pore size of the exhaust gas filter 521, the exhaust gas filter 521 of this Example has the excellent filter characteristics, and by using aluminum titanate as a primary component of the filter body, the exhaust gas filter 521 has the low thermal expansion coefficient to achieve the excellent thermal shock resistance, and also has the excellent thermal resistance. Aluminum titanate may be used as a main component of the closure material 524.

(EXAMPLE 5)

Aluminum titanate powder, comprising aluminum titanate as a primary component, a methyl cellulose binder, a polymeric ester lubricant, a polymeric, organic pore-forming agent, and water were blended together in the ratio shown in Table 11, and this blend was mixed for 3 minutes by a high-speed mixer, and then this mixture was kneaded for 30 to 120 minutes by a kneader to form a bulk material (that is, a lump of kneaded material) for extrusion purposes. Then, by extruding the thus obtained bulk material by a vacuum extruder, a columnar extruded product (having a number of axial cells 522, a diameter of 170 mm and a height of 180 mm) was formed. Then, the extruded product was dried at 80° to 100° C. for 24 hours. Then, the cells 522 were closed alternately by a closure material 524 (comprising aluminum titanate as a primary component) at each of the opposite ends of the dried extruded product. Then, the extruded product was calcined at 1,480° to 1,520° C. by an electric furnace to form a sintered product, and the sintered product was finished to form an exhaust gas filter 521 (having a diameter of 140 mm and a height of 150 mm) of this Example.

The thus prepared exhaust gas filter 521 was set in a regeneration combustion system having an electric heater, and then a regeneration combustion test was conducted in such a manner that 5 to 50 g of particulate matter (discharged from a diesel engine) per liter of the volume of the exhaust gas filter 521 was deposited on the exhaust gas filter 521. As a result, the exhaust gas filter 521 of this Example was not melted, and was not cracked due to a thermal shock even at a temperature of more than 1,300° C., and also exhibited good thermal resistance and thermal shock resistance even when the combustion temperature reaches 1,500° C.

As described above, in this Example, there can be obtained the exhaust gas filter which is not melted, and is not cracked due to a thermal shock even when the combustion temperature rises at least to 1,300° C. during the regeneration combustion, and therefore has good thermal resistance and thermal shock resistance.

[Sixth Embodiment]

A preferred embodiment of an exhaust gas filter of the invention, as well as a method of producing the same, will now be described in detail.

(EXAMPLES 1 and 2)

Figure 14A:
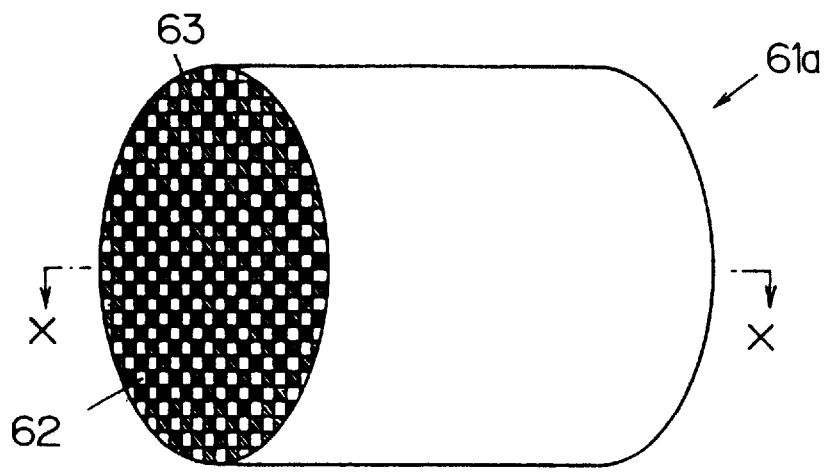
FIG. 14A is a perspective view showing the appearance of an exhaust gas filter according to Example 1 of a sixth embodiment.
Figure 14B:
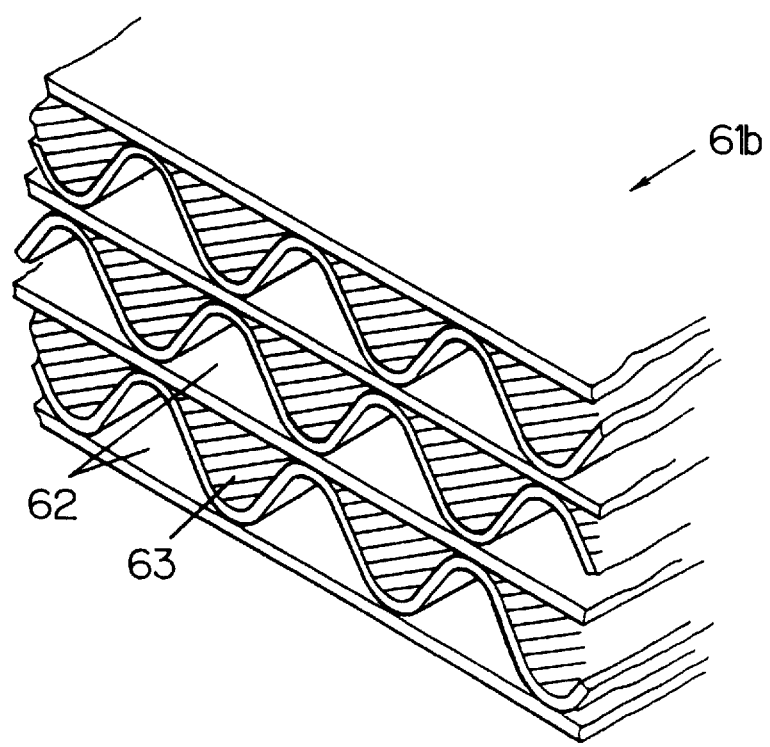
FIG. 14B is a perspective view of an essential part of an exhaust gas filter according to Example 2 of the sixth embodiment.
Figure 15:
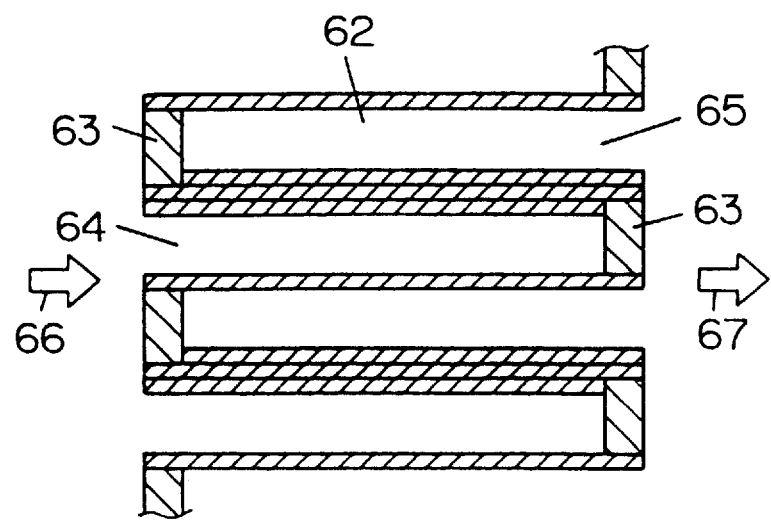
FIG. 15 is a cross-sectional view of an essential part taken along the line X—X of FIG. 14A.

FIG. 14A is a perspective view showing the appearance of an exhaust gas filter according to a first Example of the invention, FIG. 14B is a perspective view showing an essential part of an exhaust gas filter according to a second Example of the invention, and FIG. 15 is a cross-sectional view of an essential part taken along the line X—X of FIG. 14A. Reference numerals 61a and 61b denote the exhaust gas filters of the first and second Examples of the invention, respectively, reference numeral 62 a cell, reference numeral 63 a closure material, reference numeral 64 an exhaust gas inlet port, reference numeral 65 an exhaust gas outlet port, reference numeral 66 an exhaust gas inlet side, and reference numeral 67 an exhaust gas outlet side.

A method of producing the above exhaust gas filters of these Examples will now be described. $Al_2O_3$—$SiO_2$ inorganic fibers, pulp, aluminum titanate powder and water were blended together in the ratio shown in Table 15, and this blend was dispersed and mixed in a tank to form a slurry.

TABLE 15

| | Blend ratio |
|---|---|
| $Al_2O_3$-$SiO_2$ inorganic fiber | 100 wt. parts |
| Pulp | 8 wt. parts |
| Aluminum titanate powder | 100 wt. parts |
| Water | 8000 wt. parts |

The thus obtained slurry was transferred to a diluting tank, and the slurry was adjusted to a predetermined volume by adding water thereto. Then, a solution of $AlCl_3.6H2$ and a solution of NaOH were added to the slurry, thereby adjusting the PH to 7.2 to 7.8. Then, a mixture of a cation-, anion- or nonion-type highmolecular coagulant and a highly-electrolytic, inorganic coagulant was added to coagulate the slurry, thereby forming a sheet comprising the $Al_{2O3-SiO2}$ inorganic fibers, the pulp and the aluminum titanate powder. Then, this sheet was corrugated, and at the same time was rolled while applying a closure material, made of aluminum titanate, thereto to form a honeycomb body (the first Example). Also, the sheet was formed into a rectangular shape, and at the same time the rectangular sheets were stacked one upon another while applying the closure material, made of aluminum titanate, thereto, thereby forming a layer body (the second Example). Each of this honeycomb body (the first Example) and this layer body (the second Example) was calcined at 1,500° to 1,550° C., and was worked, thereby forming exhaust gas filters of the first and second Examples.

The exhaust gas filters 61a and 61b of these Examples had a columnar shape, and had a number of cells 62 formed in the filter body, and extending axially from the exhaust gas inlet side 66 to the exhaust gas outlet side 67, and the cells 62 were closed alternately by the closure material 63 at each of the opposite ends of the exhaust gas filter (that is, each of the cells 62 was closed at one of the opposite ends thereof). The number of the cells per $cm^2$ in a cross-section perpendicular to the axis of the filter body was 36.

Then, with respect to the thus obtained exhaust gas filters, a pressure loss, a thermal expansion coefficient, a tensile strength, thermal conductivity, an average pore size, a porosity, and the distribution of the pores were measured. The pressure loss between the exhaust gas inlet side and the exhaust gas outlet side was measured at the air-blasting rate of 400 cm/sec, using a blast pressure loss meter having a water column manometer, and the measured pressure loss was 95 mmAq. The thermal expansion coefficient was measured using a longitudinal thermal expansion meter. The thermal expansion coefficient in the axial direction and in the direction of the layer in the range of room temperature to 850° was $0.8\times10^{-6}/°C$., and the thermal expansion coefficient difference from room temperature to 850° C. was $|11.3\times10^{-6}|/°C$. The tensile strength was measured using a strength testing machine. The tensile strength in the axial direction was 135 Kg/cm2. The thermal conductivity was measured according to an ordinary method, using a thermal conductivity meter. The thermal conductivity in the axial direction was 0.27 Kcal/mh°C. The average pore size and the porosity were measured according to an ordinary method, using a mercury porosimeter. The average pore size was 12.5 μm, and the pores were distributed uniformly, and the porosity was 54%. Then, the crystal phase was identified by powder X-ray diffraction, and as a result it was found that aluminum titanate was the main component.

As described above, in these Examples, there can be obtained the exhaust gas filters which have the low thermal expansion coefficient, the high tensile strength, the high thermal conductivity, the excellent thermal shock resistance, the uniformly-distributed pores, the suitable pressure loss, the suitable porosity, a suitable number of cells, and the excellent filter characteristics. It has been also found that when the crystal phase of the exhaust gas filter contains, as a primary component, at least one of cordierite, mullite, aluminum titanate, spodumene, eucryptite, potassium titanate, quartz and corundum in such an amount as not to affect the thermal shock resistance and the filter characteristics, similar effects can be achieved. Further, it has been found that when the ceramics powder, contains, as a primary component, at least one of cordierite, mullite, aluminum titanate, spodumene, eucryptite, potassium titanate, silica, alumina and clay mineral, similar effects can be achieved. Each of the exhaust gas filters (a) and (b) of these Examples had a columnar shape, and had cells 62 formed in the filter body. The cells 62 were closed alternately by the closure material 63 at one of the exhaust gas inlet side 66 and the exhaust gas outlet side 67 (that is, each of the cells 62 was closed at one of the opposite ends thereof). The number of the cells per cm² in a cross-section perpendicular to the axis of the filter body was 36.

(EXAMPLE 3)

Figure 16:
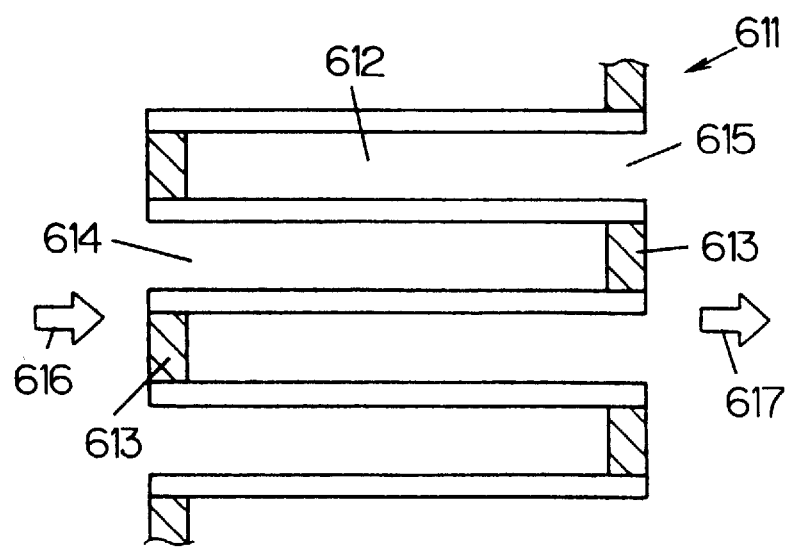
FIG. 16 is a cross-sectional view showing an essential part of an exhaust gas filter according to Example 3 of the sixth embodiment.

FIG. 16 is a cross-sectional view of an essential part of an exhaust gas filter of a third Example of the invention. Reference numeral 611 denotes the exhaust gas filter of the third Example of the invention, reference numeral 612 a cell, reference numeral 613 a closure material, reference numeral 614 an exhaust gas inlet port, and reference numeral 615 an exhaust gas outlet port. A method of producing the above exhaust gas filter 611 of the third Example will now be described. Clay mineral, having sericite as a main crystal phase, and containing 2.0 wt. % K2O, a methyl cellulose binder, a polymeric ester lubricant, a polyethylene pore-forming agent, and water were blended together in the ratio shown in Table 16, and this blend was mixed for 3 minutes by a high-speed mixer, and then this mixture was kneaded for 30 to 120 minutes by a kneader, thereby forming a bulk material (i.e., a lump of kneaded material) for extruding purposes.

TABLE 16

|  | Blend ratio |
| --- | --- |
| Clay mineral | 100 wt. parts |
| Binder | 15 wt. parts |
| Lubricant | 4 wt. parts |

TABLE 16-continued

|  | Blend ratio |
| --- | --- |
| Pore-forming agent | 50 wt. parts |
| Water | 30 wt. parts |

Then, using a vacuum extruder, the thus obtained bulk material was formed into a columnar extruded product (having a diameter of 170 mm and a height of 180 mm) having a number of cells extending in the axial direction. This extruded product was dried at 80° to 100° C. for 24 hours, using a dryer. Then, using an electric furnace, the dried extruded product was calcined at a temperature in the range of 1,470° to 1,520° C. to form a sintered product, and the cells were closed alternately at each of the opposite ends of the sintered product (that is, each of the cells was closed at one of the opposite ends thereof). Then, the sintered product was worked to prepare an exhaust gas filter 611 of the third Example. The exhaust gas filter 611 thus formed had a columnar shape, and had a number of cells 612 formed in the filter body, and extending axially from the exhaust gas inlet side 616 to the exhaust gas outlet side 617. The cells 612 were closed alternately by the closure material 613 at one of the exhaust gas inlet side 616 and the exhaust gas outlet side 617 (that is, each of the cells 612 was closed at one of the opposite ends thereof). The number of the cells per cm² in a cross-section perpendicular to the axis of the filter body was 49.

Then, the physical properties of the above exhaust gas filter were measured as in Example 1. As a result, the pressure loss between the exhaust gas inlet side and the exhaust gas outlet side at the air-blasting rate of 400 cm/sec was 124 mmAq. The thermal expansion coefficient in the axial direction in the range of from room temperature to 850° C. was $2.8\times10^{-6}/°C$. The thermal expansion coefficient difference between the axial direction and the direction of the layer from room temperature to 850° C. was $|0.5\times10^{-6}|/°C$. The tensile strength in the axial direction was 175 kg/cm². The thermal conductivity in the axial direction was 0.34 kcal/mh°C. The average pore size was 7.8 μm, and the pores were uniformly distributed, and the porosity was 43%. The crystal phase was identified by powder X-ray diffraction, and as a result it was found that mullite was the main component.

As described above, in this Example, there can be obtained the exhaust gas filter which has the low thermal expansion coefficient, the high tensile strength, the high thermal conductivity, the excellent thermal shock resistance, the uniformly-distributed pores, the suitable pressure loss, the suitable porosity, a suitable number of cells, and the excellent filter characteristics. It has been also found that when the crystal phase of the exhaust gas filter contains, as a primary component, at least one of cordierite, mullite, aluminum titanate, spodumene, eucryptite, potassium titanate, quartz and corundum in such an amount as not to affect the thermal shock resistance and the filter characteristics, similar effects can be achieved. Further, it has been found that when the ceramics powder, contains, as a primary component, at least one of cordierite, aluminum titanate, spodumene, eucryptite, potassium titanate, silica, alumina and clay mineral, similar effects can be achieved. It has been found that even when the main crystal phase of clay mineral used as the ceramics powder is kaolinite or pyrophillite, similar effects can be achieved.

As described above, in the present invention, the following excellent advantages are achieved. Namely, the pressure loss between the exhaust gas inlet side and the exhaust gas outlet side is 30 to 190 mmAq, and the number of the cells per cm² in a cross-section perpendicular to the axial direction is 9 to 64, and the average pore size is 1 to 20 µm, and the pores are uniformly distributed, and the porosity is 30 to 70%. Therefore, there can be achieved the exhaust gas filter which has the excellent filter characteristics, and can efficiently collect particulate matter in exhaust gas.

The thermal expansion coefficient of the exhaust gas filter in the axial direction is not more than $4.5 \times 10^{-6}/°C.$, and the difference between the thermal expansion coefficient in the axial direction and the thermal expansion coefficient in the direction of the layer is not more than $|5.0 \times 10^{-6}|/°C.$, and the tensile strength in the axial direction is not less than 40 kg/cm², and the thermal conductivity in the axial direction is not less than 0.100 kcal/mh°C. Therefore, there can be achieved the exhaust gas filter which has the excellent thermal shock resistance to withstand a thermal stress due to a temperature gradient occurring during the regeneration combustion.

The exhaust gas filter is formed by the paper-making method, using $Al_2O_3$—$SiO_2$ inorganic fibers, pulp and the ceramics powder, or the exhaust gas filter is formed by extrusion, using the ceramics powder, the binder, the lubricant and the pore-forming agent, and the number of cells per cm² in a cross-section perpendicular to the axial direction is 9 to 64. Therefore, there can be achieved the method of producing the exhaust gas filter with excellent filter characteristics, in which the pressure loss between the exhaust gas inlet side and the exhaust gas outlet side is 30 to 190 mmAq at the air-blasting rate of 200 to 600 cm/sec, and the average pore size 1 to 20 µm, and the pores are uniformly distributed, and the porosity is 30 to 70%, and this method can mass-produce the exhaust gas filter at low costs.

When the ceramics powder, contains, as a primary component, at least one of cordierite, mullite, aluminum titanate, spodumene, eucryptite, potassium titanate, silica, alumina and clay mineral, the crystal phase of the exhaust gas filter contains, as a primary component, at least one of cordierite, mullite, aluminum titanate, spodumene, eucryptite, potassium titanate, quartz and corundum. There can be achieved the exhaust gas filter in which thermal expansion coefficient in the axial direction from room temperature to 850° C. is not more than $4.5 \times 10^{-6}/°C.$, and the difference between the thermal expansion coefficient in the axial direction and the thermal expansion coefficient in the direction of the layer is not more than $|5.0 \times 10^{-6}|/°C.$, and the tensile strength in the axial direction is not less than 40 kg/cm², and the thermal conductivity in the axial direction is not less than 0.100 kcal/mh°C., and the thermal shock resistance is quite excellent. There can also be achieved the method of producing this exhaust gas filter.

What is claimed is:

1. An exhaust gas filter comprising a filter body which is made of a ceramics material, and has a number of cells formed therein, and extending axially from an exhaust gas inlet side of said body to an exhaust gas outlet side of said body, said body comprising aluminum titanate, wherein the filter body has a thermal expansion coefficient ($\alpha_a$) in an axial direction in a temperature range from room temperature to 850° C. and a thermal expansion coefficient in a direction perpendicular to the axial direction ($\alpha_b$) in said temperature range from room temperature to 850° C., wherein each of $|\alpha_a|$ and $|\alpha_b|$ is at most $2.5 \times 10^{-6}$ °C.$^{-1}$, and the absolute value of the difference between the thermal expansion coefficient in the axial direction and the thermal expansion coefficient in the direction perpendicular to the axial direction is from $0.5 \times 10^{-6}$ °C.$^{-1}$ to $5.0 \times 10^{-6}$ °C.$^{-1}$; and $\||\alpha_a|$ minus $|\alpha_b|\|$ is at most $1.1 \times 10^{-6}$ °C.$^{-1}$.

2. An exhaust gas filter comprising a honeycomb columnar body comprising aluminum titanate as a primary component, wherein when a thermal expansion coefficient αa of said honeycomb columnar body in a direction parallel to a direction of flow of exhaust gas through said honeycomb columnar body is $-2.8 \times 10^{-6}$ °C.$^{-1}$~0° C.$^{-1}$ (room temperature to 800° C.), a thermal expansion coefficient αb of said honeycomb columnar body in a direction perpendicular to said direction of flow of the exhaust gas is 0~$2.8 \times 10^{-6}$ °C.$^{-1}$ (room temperature to 800° C.), or when a thermal expansion coefficient αa of said honeycomb columnar body in the direction parallel to the direction of flow of the exhaust gas is 0~$2.8 \times 10^{-6}$ °C.$^{-1}$ (room temperature to 800° C.), a thermal expansion coefficient αb of said honeycomb columnar body in the direction perpendicular to said direction of flow of the exhaust gas is $-2.8 \times 10^{-6}$ °C.$^{-1}$~0° C.$^{-1}$ (room temperature to 800° C.), and the absolute value of the difference between the thermal expansion coefficient in the direction parallel to the direction of flow of the exhaust gas and the thermal expansion coefficient in the direction perpendicular to the direction of flow of the exhaust gas is from $0.5 \times 10^{-6}$ °C.$^{-1}$ to $5.0 \times 10^{-6}$ °C.$^{-1}$; and $\||\alpha_a|$ minus $|\alpha_b|\|$ is at most $1.1 \times 10^{-6}$°C.$^{-6}$.

* * * * *